(12) United States Patent
Nesper et al.

(10) Patent No.: US 9,337,481 B2
(45) Date of Patent: May 10, 2016

(54) ELECTRODE (ANODE AND CATHODE) PERFORMANCE ENHANCEMENT BY COMPOSITE FORMATION WITH GRAPHENE OXIDE

(71) Applicant: Belenos Clean Power Holding AG

(72) Inventors: Reinhard Nesper, Amden (CH); Tommy Kaspar, Mels (CH); Yoann Mettan, Regensdorf (CH)

(73) Assignee: Belenos Clean Power Holding AG, Bienne (CH)

(*) Notice: Subject to any disclaimer, the term of this patent is extended or adjusted under 35 U.S.C. 154(b) by 0 days.

(21) Appl. No.: 14/154,275

(22) Filed: Jan. 14, 2014

(65) Prior Publication Data
US 2014/0127562 A1 May 8, 2014

Related U.S. Application Data

(63) Continuation of application No. 13/277,360, filed on Oct. 20, 2011, now Pat. No. 8,802,295.

(30) Foreign Application Priority Data

Oct. 22, 2010 (EP) .................................... 10188609
Dec. 21, 2010 (EP) .................................... 10196127

(51) Int. Cl.
H01M 4/13 (2010.01)
H01M 4/36 (2006.01)
(Continued)

(52) U.S. Cl.
CPC ............... *H01M 4/364* (2013.01); *C01G 31/00* (2013.01); *H01M 4/131* (2013.01);
(Continued)

(58) Field of Classification Search
CPC . C01G 31/00; C01P 2004/03; C01P 2004/64; C01B 31/0626; H01M 4/13; H01M 4/583; H01M 10/0525; H01M 4/525; H01M 10/052; H01M 10/44; H01M 4/0471; H01M 4/131; H01M 4/1391; H01M 4/485; Y02E 60/122
USPC ............. 429/322, 209, 212, 215, 218.1, 224, 429/231.2, 231.5, 231.7, 231.95, 249
See application file for complete search history.

(56) References Cited

U.S. PATENT DOCUMENTS

2010/0176337 A1* 7/2010 Zhamu et al. .............. 252/182.1

FOREIGN PATENT DOCUMENTS

EP 1268346 A1 1/2003
WO 0174716 A1 10/2001

OTHER PUBLICATIONS

Vanessa Legagneur, et al. "New layered vanadium oxides MyHl_yV3O8•nH2O (M=Li, Na, K) obtained by oxidation of the precursor H2V3Os" Journal of Materials Chemistry, 2000, pp. 2805-2810, vol. 10.*

(Continued)

*Primary Examiner* — Patrick Ryan
*Assistant Examiner* — Ben Lewis
(74) *Attorney, Agent, or Firm* — Sughrue Mion, PLLC

(57) ABSTRACT

Described is an electrode comprising and preferably consisting of electronically active material (EAM) in nanoparticulate form and a matrix, said matrix consisting of a pyrolization product with therein incorporated graphene flakes and optionally an ionic lithium source. Also described are methods for producing a particle based, especially a fiber based, electrode material comprising a matrix formed from pyrolized material incorporating graphene flakes and rechargeable batteries comprising such electrodes.

15 Claims, 16 Drawing Sheets

(51) Int. Cl.
  H01M 4/131    (2010.01)
  H01M 4/1391   (2010.01)
  H01M 4/485    (2010.01)
  H01M 10/44    (2006.01)
  C01G 31/00    (2006.01)
  H01M 4/62     (2006.01)
  H01M 10/04    (2006.01)
  H01M 10/052   (2010.01)
  H01M 4/04     (2006.01)

(52) U.S. Cl.
  CPC ......... H01M 4/1391 (2013.01); H01M 4/485 (2013.01); H01M 4/625 (2013.01); H01M 10/04 (2013.01); H01M 10/44 (2013.01); *C01P 2002/72* (2013.01); *C01P 2002/77* (2013.01); *C01P 2004/03* (2013.01); *H01M 4/0471* (2013.01); *H01M 10/052* (2013.01); *Y02E 60/122* (2013.01); *Y10T 29/49108* (2015.01)

(56) References Cited

OTHER PUBLICATIONS

Vanessa Legagneur, et al. "New layered vanadium oxides MyHI_yV3O8 • nil2O (M=Li, Na, K) obtained by oxidation of the precursor H2V3Os" Journal of Materials Chemistry, 2000, pp. 2805-2810, vol. 10.*

Vanessa Legagneur, et al. "New layered vanadium oxides MyHl-yV3O8 x nH2O (M=Li, Na, K) obtained by oxidation of the precursor H2V3O8" Journal of Materials Chemistry, 2000, pp. 2805-2810, vol. 10.

Hanns-Peter Boehm, et al., "Annalen der Chemie", Untersuchungen am Graphitoxyd, 1965, pp. 1-8, No. 691.

P. Rozier, et al. "Solid Solution (Li1.3-yCuy)V3O8: Structure and Electrochemistry" Chem. Mater., 2005, pp. 984-991, vol. 17.

Michael E. Spahr, "Electrochemistry of Chemically Lithiated NaV3O8: a Positive Electrode Material for Use in Rechargeable Lithium-Ion Batteries", J. Electrochem. Soc., 1998, pp. 984-991, vol. 145, No. 2.

See-How Ng, et al., "A Feasibility Study on the Usr of Li4V3O8 as a High Capacity Cathode Material for Lithium-Ion Batteries", Chem. Eur. J., 2008, pp. 11141-11148, vol. 14.

Shaokang Gao, et al., "Single crystal nanobelts of V3O7 x H2O: A lithium intercalation host with a large capacity" Electrochimica Acta, 2009, pp. 1115-1118, vol. 54.

Yoshio Oka, et al. "Structure Determination of H2V3O8 by Powder X-Ray Diffraction", Journal of Solid State Chemistry, 1990, pp. 372-377, vol. 89.

Francois Theobold, et al., "La methode hydrothermale a permis de preparer V3O7, H2O. Le domaine d'exis-tence de cetter phase a ete etudie. Par ses parametres cristallographiques V3O7, H2O s'apparente aux phases voisines du systeme V-O", Comptes Rendus Hebdomadaires des Seances de L' Academie des Sciences, 1970, pp. 2138-2141, Series C, No. 270.

\* cited by examiner

ELECTRODE (ANODE AND CATHODE) PERFORMANCE ENHANCEMENT BY COMPOSITE FORMATION WITH GRAPHENE OXIDE

CROSS-REFERENCE TO RELATED APPLICATIONS

This is a Continuation Application of U.S. application Ser. No. 13/277,360 filed Oct. 20, 2011, which claims priority from European Patent Application No. 10188609.1 filed Oct. 22, 2010 and European Patent Application No. 10196127.4 filed Dec. 21, 2010, the entire disclosures of which are incorporated herein by reference.

TECHNICAL FIELD

This invention relates to an improved electrode material and to methods for manufacturing such an improved electrode material and a battery comprising such electrode material.

BACKGROUND ART

Several rechargeable batteries are known. However, they still bear several disadvantages such as high weight, low capacity, slow charging, fast aging etc. In particular for applications with reduced place or intended mobility such as computers, cars and electro bicycles low weight, high capacity, fast charging and long lifetime are desired. During the last years high efforts have been made to improve electrode materials or to reduce the disadvantages mentioned above.

Many materials that gained interest during the last years are ceramic based materials used in nanoparticulate form. These nanoparticles may be polygonal, spherical, or in one direction elongated up to an elongation qualifying them as fibers. One of such fibrous materials is $H_2V_3O_8$.

$H_2V_3O_8$ is a known compound that has already been described in 1970 [1] and that was structurally analyzed in 1990 [2]. Also investigated as cathode material was $H_yNa_{1-y}V_3O_8$ [3]. $H_yNa_{1-y}V_3O_8$ is described to intercalate up to 3 lithium ions during the first discharging cycle. Upon charging, the three lithium ions are deintercalated.

Although the fibrous $H_2V_3O_8$ is able to reversibly exchange large amounts (up to 4.5 eq.) of lithium [4], due to the therewith connected volume changes, the fibers decompose into small fragments that show an optimal exchangeability at a certain fragmentation, wherein the capacity is markedly reduced upon further fragmentation so that the stability of the electrode is compromised.

Other cathode materials include $Li_4V_3O_8$ [5], $NaV_3O_8$ [6] and $Li_{1.3-y}Cu_yV_3O_8$ [7], $Li_xFePO_4$, $Li_xCoO_2$, $Li_xMn_2O_4$, $Li_x(Mn_uCo_vNi_yAl_z)O_2$ with $u+v+y+z\approx 1$.

Also suitable anode materials are already known. These include $Li_xC_6$ and lithium alloys.

Suitable EA materials usually are formed into electrodes by means of a binder that is conductively filled, e.g. with conducting carbon black and/or graphite, and/or that may itself be electronically conducting. The binder and the conducting fillers significantly add to the volume and to the total weight of the battery without actually participating in the charging discharging cycle.

There have already several attempts been made to reduce the weight of the binder/filler matrix, e.g. by using conductive binder in nanoparticulate form (see published European patent application EP 2 228 855) or by preparing a pyrolized product as substitute for a polymeric binder. The disclosure of the above prior publication is incorporated herein in its entirety.

While these attempts brought some weight reduction, there is still a need for a further reduced amount of optionally conductively filled binding material. Said binding material that optionally comprises a conductive filler is further on also referred to as binder matrix or matrix.

DISCLOSURE OF THE INVENTION

Hence, it is a general object of the invention to provide an electrode with low or reduced matrix content and a high matrix conductivity at large mechanical stability.

It is a further object of the invention to provide a method for producing electrodes with low matrix content and a high matrix conductivity at large mechanical stability.

It is a further aspect of the present invention to provide batteries comprising at least one of the cathode or anode with reduced or low matrix content, preferably both electrodes.

It is another object of the present invention to provide an electrode with enhanced cycle stability.

Now, in order to implement these and still further objects of the invention, which will become more readily apparent as the description proceeds, the electrode of the present invention is manifested by the characteristics that it comprises and preferably consists of electronically active material (EAM) in nanoparticulate form and a matrix, said matrix consisting of a pyrolization product with therein incorporated graphene flakes and optionally an ionic lithium source and—dependent on the EAM—optionally also a stabilizing agent (for $H_2V_3O_8$ e.g. vanadium (IV) sulfate).

The pyrolization product is obtained by pyrolyzing a suitably pyrolizable material, e.g. in a method that also belongs to the present invention.

For a good binding, the weight ratio of the matrix to the nanoparticulate material in the final product, i.e. the active electrode, is at most 10% by weight and preferably 5±2% by weight referred to the weight of the active electrode, i.e. the electrode without current collector, or the electronically active coating, respectively. The matrix comprises graphene oxide in a ratio of amorphous carbonaceous material to graphene of about 2:1 to about 1:1, preferably about 3:2.

Any cathode materials and also anode materials may be used as EAM, provided that they are present in form of nanoparticles. A much preferred EAM is, prior to the first charging or discharging, $Li_xH_{2-x}V_3O_8$, wherein at least 1 of the 3 V-atoms in the formula unit has the oxidation state 4+ and x ranges from 0.1 to 1.5 and usually is around 1. This green-yellow colored EAM has the advantageous feature that at least part of the Lithium ($Li_z$ in the formula unit) can be removed during the first charge.

The method for producing a particle based, especially a fiber based electrode material is manifested by the steps of (A) preparing an electronically active precursor material comprising dispersion, said suspension comprising (i) a soluble lithium source and a hydroxide source, especially lithium hydroxide, and (ii) an at least partially organic substance that is water soluble and that—mixed with electronically active material—can be pyrolized, and (iii) electronically active material (EAM), and (iv) graphene oxide (GO)

(B) separating the solid electronically active precursor material from the liquid phase, (C) drying the electronically active precursor material of step (B)

(D) pyrolizing the electronically active precursor material of step (C) to yield an active electrode material,
and optionally
(E) applying the electronically active precursor material of step (B) to a substrate, especially a current collector and/or cutting the active electrode material to shape and placing the active electrode material on a current collector.

Such electrode may be further processed into a cell by covering the electrode with at least one separator and then filling the cell with electrolyte, completing the cell with an anode and then tightly closing the cell.

Below some terms used are further defined:
electronically active precursor material=the wet or dry material prior to the pyrolization step
electronically active coating or active electrode or active electrode material=the pyrolized material of the ready for use electrode, or the electrode without the current collector, respectively.

Dependent on the EAM used, it may be advantageous or even necessary to stabilize the EAM during electrode preparation, e.g. by adding a stabilizing agent such as a metallic compound that is soluble and comprises the metal in a suitable oxidation state such as V(IV), e.g. as sulfate, to stabilize $H_2V_3O_8$.

In a first specific embodiment the method for producing a particle based, especially a fiber based electrode material is manifested by the steps of
(a) preparing a solution comprising a lithium source and a hydroxide source, especially lithium hydroxide, and an at least partially organic substance that is water soluble and that—mixed with electronically active material—can be pyrolized, said solution being prepared by dissolving the organic compound, the lithium source and the hydroxide source in an organic solvent and/or water, preferably water,
(b) adding an aqueous dispersion/solution of graphene oxide while ensuring that the pH remains between 8 and 10,
(c) dispersing electronically active material (EAM) in the dispersion prepared in step (b) and homogenizing,
(d) performing a hydrothermal step for lithiation, self-assembly and thermolysis of graphene oxide to graphene under pressure enhancing conditions resulting in a electronically active precursor material comprising dispersion, said dispersion being in the form of a black liquid with a dense solid floating in it,
(e) separating the electronically active precursor material from the liquid phase without washing,
(f) applying the electronically active precursor material of step (e) to a substrate, e.g. a current collector,
(g) drying the electronically active precursor material,
(h) pyrolizing the electronically active precursor material to yield an electrode.

In a second specific embodiment, the method of the present invention is manifested by the steps of
(a) dispersing optionally stabilized EAM in an organic solvent and/or water, preferably water,
(b) adding a graphene oxide solution,
(c) freezing the suspension obtained in step (b),
(d) thawing the frozen suspension by warming it up, preferably to room temperature (RT),
(e) adding a lithium source and a hydroxide source, especially lithium hydroxide, and an at least partially organic substance that is water soluble and that mixed with electronically active material—can be pyrolized,
(f) waiting until the suspension comprising the electronically active precursor material is dark blue and then recovering the electronically active precursor material, (g) drying the electronically active precursor material first at a temperature below the boiling temperature of the organic solvent and/or water, e.g. at RT, and then at a temperature above the boiling temperature of the organic solvent and/or water,
(h) pyrolyzing the dried electronically actine precursor material to yield an active electrode material,
(g) evacuating the hot active electrode material for at least 30 minutes and (during this evacuation time) cooling the active electrode material, and optionally
(h) cutting the electrode material into shape and placing it on a current collector.

Suitable pyrolising materials are materials that are thermolysable within about 150° C. to about 350° C., preferably at about 200° C. and that in case of cathodic electronically active material (EAM) are oxidizing, especially hydroxy carboxylic acids and sugars, in case of anodic EAM reducing, especially organic materials with low oxygen content such as polyanilines.

The reaction is preferably performed in water. However, in case of water sensitive EAM, another solvent may be used, e.g. an aprotic polar solvent that is miscible with water. In the scope of the present invention the term solvent also encompasses a mixture of two or more solvents. Examples for polar aprotic solvents are acetonitril and/or tetrahydrofurane. Water is not subsumed under the term solvents.

The organic part comprising substance may be any pyrolizable substance such as a pyrolizable sugar like lactose, but preferably is a lithium salt, in particular a lithium hydroxycarboxylate such as lithium lactate, lithium citrate or another pyrolizable anion comprising lithium compound, but preferably is or comprises lithium lactate. The lithium lactate simultaneously acts as binder precursor for being pyrolized and as part of the lithium source. Since also a hydroxide source must be present, another preferred lithium source is lithium hydroxide that simultaneously acts as at least part of the hydroxide source. If the EAM is $H_2V_3O_8$ or a partially lithiated form, such as $Li_xH_2V_3O_8$ that in later steps is converted to $Li_xH_{2-x}V_3O_8$ with x ranging from 0.1 to 1.5, preferably 0.5 to 1.5, then the dispersion prepared in step (a) also comprises a vanadium(IV) source as stabilizer. In a preferred embodiment, a partially lithiated $H_2V_3O_8$ is used or directly generated in the inventive method such as $Li_xH_{2-x}V_3O_8$ with x ranging from 0.1 to 1.5 and usually being around 1.

The graphene solution used in step (b) may be prepared according to co-owned published European patent application EP 2 256 087, the disclosure of which is enclosed herein in its entirety. A specific example can be found in the experimental part.

The electronically active particles are glued together by a binder based on pyrolized material. Besides of the pyrolized material, e.g. the pyrolized lactate, the binder matrix comprises graphene and optionally and preferably also lithium or lithium and transition metal, e.g. vanadium, or it may consist of pyrolized material, graphene and optionally and preferably lithium or lithium and transition metal such as vanadium. The pyrolized material is predominantly formed by amorphous carbonaceous material but may also comprise minor amounts of oxygen and hydrogen containing reaction products.

For a good binding, the weight ratio of the matrix to the nanoparticulate material in the final product, i.e. the active electrode, is at least about 2% by weight, preferably at least 3% by weight and the upper limit should not exceed 10% by weight and preferably is 5±2% by weight referred to the weight of the active electrode, i.e. the electrode without current collector, or the electronically active coating, respectively. These values are also referred to as reduced or low binder content. In order to get a range of 5±2% by weight in the final electrode, about 5 to 15 mol-%, preferably 7 to 13 mol-%, much preferred about 10 mole-% of pyrolizable material is used, and graphene oxide in an amount suitable to provide a ratio of amorphous carbonaceous material to graphene of about 2:1 to about 1:1, preferably about 3:2.

The above described binding method may be applied to all cathode materials and also to anode materials, provided that the EAM are used in form of nanoparticles and the pyrolizable material is suitably chosen for anodes or cathodes, respectively. Examples for such EAM are:

cathode materials: oxidizing materials, especially oxidic materials such as e.g. $Li_xTPO_4$, $Li_xTSiO_4$, $Li_xTBO_3$ with T=Mn, Fe, $Li_4V_3O_8$ [5], $NaV_3O_8$ [6] and $Li_{1.3-y}Cu_yV_3O_8$ [7], $Li_xFePO_4$, $Li_xCoO_2$, $Li_xMn_2O_4$, $Li_x(Mn_nCo_vNi_yAl_z)O_2$ with u+v+y+z≈1 and $Li_xH_{2-x}V_3O_8$ with x ranging from 0 to 1.5, preferably from 0.1 to 1.5.

anode materials: reducing materials such as $Li_xC_6$ and lithium alloys.

One preferred cathode material is $H_2V_3O_8$, in particular in a partially lithiated form, i.e. $Li_xH_{2-x}V_3O_8$.

$Li_xH_{2-x}V_3O_8$ may be prepared in the inventive method as described before or demonstrated below in one of the examples, i.e. the lithium comprising material may directly be generated during the preparation of the electronically active precursor material.

If a pressure enhancement is desired, e.g. in the first specific embodiment, the reaction vessel is sealed. Homogenization takes place, e.g. by means of ultrasound and/or shaking. If a hydrothermal step is performed, such as step (d) of the first specific embodiment, the temperature usually is in a range of 140 to 160° C., such as 150° C., and the time needed for such hydrothermal step usually is about 1 to 2 hours, such as 1.5 hours. During this hydrothermal step, the pressure inside the vessel has been found to increase to approx. 3-4 bar while lithiation, self-assembly and thermolysis of graphene oxide (GO) to graphene takes place.

In the hydrothermal step, the suspension changes into a black liquid with a dense solid floating in it. This dense solid floating material is the electronically active precursor material that is subsequently applied to the substrate, in particular a current collector, after having been separated from the liquid phase. This separation of the solid phase from the liquid phase is much preferably performed without washing.

Once applied to the current collector (or other substrate), the remaining liquid is removed, e.g. soaked with a paper or tissue until the paper or tissue remains dry after having been pressed against the solid deposit on the current collector. This may either be done batchwise, with an e.g. paper or tissue covered flat press or continuously with an e.g paper or tissue covered roll or roll system. This drying method has the advantage that simultaneously a compaction of the electrode is achieved.

Then the electrode is further dried, e.g. air dried. The temperature in this drying step should be below the boiling point of the solvents present, in the case of water in the range of 80 to 90° C. such as 85° C. At these temperatures, a drying time of about 10 minutes proved sufficient for a layer thickness of about 100 μm. The drying time is dependent of the layer thickness and for a preferred range of 50 μm to 500 μm ranges from about 5 minutes to about 60 minutes. The last step, the pyrolysis step is subsequently performed at pyrolysis temperature, for preferably partially lithiated $H_2V_3O_8$ e.g. 200 to 250° C., such as 220° C. During this step the organic substance, e.g. the lactate is mainly reacted to amorphous carbonaceous material. The pyrolysis step may be performed in air and takes at least about 5 min. Cooling is performed by subjecting the hot electrode to a vacuum, then treating it with inert gas such as nitrogen or argon again followed by vacuum. The inert gas treatment followed by application of vacuum may be performed more than once. Then the cooling is continued under vacuum. A suitable container for inert gas and vacuum treatment—at least at laboratory scale—is a glove box. Evacuation during and following cooling is performed for at least 1 hour in the first specific embodiment or at least 30 minutes in the second specific embodiment, leading to the removal of volatile pyrolysis products.

The low temperature that may be applied during the pyrolysis step is at least partially due to a temperature lowering effect of specific EAM, such as optionally and preferably partially lithiated $H_2V_3O_8$.

The term particle, particulate in connection with the electronically active material and optionally in connection with the binder refers to nanosized or microsized particles, especially to elongated particles with one dimension exceeding the other dimensions for at least about 20 times. Such particles with one dimension exceeding the others for at least 20 times is also termed fiber. Usual particle sizes for non elongated particles are e.g. <500 nm, in particular nanoparticles having an average particle size in the range of 5 to 500 nm, preferably in the range of 5 to 400 nm, more preferred in the range of 20 to 300 nm. In the case of elongated particles, preferred dimensions are a width of less than 200 nm, preferably about 100 nm and a length of up to about 100 μm, preferably about 10 μm.

If the fibers are too long, they may be pestled during dispersion resulting in shorter fibers.

In the second specific embodiment, if $Li_xH_{2-x}V_3O_8$ with x=0 to 1.5, preferably 0.1 to 1.5, is used, this compound is preferably stabilized by addition of vanadyl sulfate. In a preferred embodiment vanadyl sulfate is dissolved in water and then the $H_2V_3O_8$ is added and dispersed. Then GO solution is added dropwise while stirring.

In the second specific embodiment, it has proved much advantageous to freeze and thaw the suspension prior to adding the at least partially organic pyrolizable compound, preferably lithium lactate and the lithium and hydroxide sources, e.g. lithium hydroxide. The preferred sequence of adding these two substances is first the lactate and once the lactate is dissolved, adding the lithium hydroxide.

The resulting blue suspension is then filtered and pre-dried at RT followed by drying above the boiling temperature of water. The dry electronically active precursor material is then transferred to a pyrolization oven operated at pyrolization temperature. The such pyrolized material is then evacuated for at least 30 minutes, optionally in inert gas atmosphere established by one or more evacuation/gas addition cycles. During this evacuation time the active electrode is cooled down to ambient temperature.

The optimization of the electrodes involves an optimized method for producing carbon coated self organized and preferably also partially lithiated electrode materials with improved electrochemical performance of the material once a cell is assembled As already mentioned above, a preferred EAM for being used in the method of the present invention is $H_2V_3O_8$ that naturally is present in form of small fibers. A more preferred EAM is $H_2V_3O_8$ that is partially lithiated during the electrode preparation process to yield $Li_xH_{2-x}V_3O_8$, wherein x ranges from 0.1 to 1.5, preferably 0.5 to 1.5; more preferred x is close to 1. This partially lithiated EAM can be converted in the battery to $Li_yH_{2-x}V_3O_8$, wherein x is as defined above and y ranges from 0 to 4.5 (dependent on the charging or discharging, respectively). The use of a partially lithiated EAM has the advantage that some Li is "stress-free" incorporated resulting in less volume work in the charging and discharching cycle.

The good behavior of the inventive cathode is assumed to be due to the $Li_xH_{2-x}V_3O_8$ being coated with a lithium ions conducting coating of pyrolized material, e.g. a material that comprises primarily carbon but possibly also oxygen, hydrogen and lithium.

Without wanting to be bound by any theory, the inventors assume that the benefit of the inventive matrix is not only the low amount of matrix material but also the fact that instead of nanoparticulate carbon and/or graphite graphene layers or rather graphene flakes are used as electronically conducting "filler" which are more elastic than the particles and in spite of their low weight and high surface area may span several EAM nanoparticles while embedded into the pyrolized conducting layer.

Compared to the $H_2V_3O_8$ regarding state of the art, the $Li_xH_{2-x}V_3O_8$ cathodes of the present invention provide significantly better results with regard to the cycling stability (or number of cycles, respectively), capacity and high power loads. The cathodes of the present invention show extraordinary high current rate capability such as a capacity of 400 Ah/kg of electronically active material at current densities up to 2 C (i.e. about 800 A/kg). Surprisingly it has even been found that loading in a current range from 20 to 2000 A/kg is possible with almost no capacity loss.

In particular the $Li_xH_{2-x}V_3O_8$ cathodes of the present invention are characterized by a cycling near theoretical capacity for 30 cycles, a capacity of at least 400 Ah/kg, such as 430 Ah/kg, in the second cycle, a capacity of still more than 400 Ah/kg after 20 cycles and a capacity of still around 380 Ah/kg after 30 cycles, which means that the material is almost constant over more than 20 cycles (1C). The cathode are furthermore characterized by an extension of the plateau from 3.5 to 4.2 volt. The practically usable capacity is between 250 and 350 Ah/kg (1C-rate around 300 A/kg). The large range is due to the fact that the capacity is dependent on the material positioning. At 2.7 V average a practical 410 Ah/kg gave rise to a single electrode specific energy of 1107 Wh/kg. Thus, a complete battery might deliver approx. 400 Wh/kg, which is roughly twice as much as a commercial battery does today.

The carbon content of the electrodes measured was 5±2% by weight (compared to still 10 to 15% by weight in the former co-owned application) referred to the active electrode and the anode used was Li.

The enormous benefit of the cathodes and anodes of the present invention is the low amount of matrix. Due to the use of a pyrolization product instead of a polymer and of graphene instead of graphite the matrix volume can be drastically reduced to at most 10% by weight and preferably 5±2% by weight referred to the electronically active material or active electrode, respectively, compared to at least 10 and up to 15% by weight of the former co-owned application with a pyrolized matrix comprising conducting filler particles, e.g. graphite instead of graphene flakes.

Suitable current collectors are titanium, nickel or (presently preferred) graphite. Also possible is aluminum, however, aluminum is less preferred because it is corrosive.

These and analogously produced cathodes and/or anodes may be used in any rechargeable lithium ion battery, preferably, however, in connection with an electrolyte selected from $LiPF_6$ in a mixture of ethylene carbonate with ethyl methyl carbonate and/or dimethyl carbonate, or $LiPF_3(C_2F_5)_3$ that proved to be more stable than $LiPF_6$.

When studying assembled cells several unexpected results were obtained. If assembled cells ($H_2V_3O_8$ electrode prepared by the hydrothermal method) were left on storage at e.g. about 30° C., the open circuit voltage (OCV) values decreased by approximately 200 mV in 4 days. The exact shape of the decay (potential vs time) has not yet been characterized. Immediately after assembly, the OCV lied at 3.50 V. After 3 days storage, the OCV equaled 3.45 V, and after 4 days storage, the OCV decreased to 3.30V.

It is assumed that the lowering of the OCV arises from aging and/or equilibration processes. The process greatly influences the performances of the battery. Storing the assembled cells under conditions corresponding to 3 days at 30° C. led to close to theoretical capacity (420-450 Ah/kg) values.

An improved charging technique has also been developed. Stable $H_2V_3O_8$ electrodes have the particularity to behave asymmetrically on charge and discharge (potential vs time). Their discharge curve displays three electroactive regions, while during the charge only two regions are observable. The deintercalation at the lowest potential (2V) does not occur in the charging curve. Nevertheless, anodic and cathodic capacities remain equal, since the missing lithium is extracted at 2.7V. The electrochemical behaviour upon charging between 2V and 2.7V was further investigated and it was found that it could not be correlated to one of the phases generated during the discharge. In addition the inventors found that there is a risk that irreversible processes might be triggered in this range. They therefore tried to avoid this phase and they found that it is possible to artificially suppress the deintercalation at 2V by programming a cyclovoltammetric (CV) step at the beginning of the charging. The idea was to quickly polarize the electrode close to 2.7V and then proceed with the galvanostatic charge at a chosen current. This procedure caused the 2V plateau to gradually disappear at the profit of more extraction at higher potential and eventually generated a longer plateau at 2.5V. This treatment allows to increase the shelf life of the battery.

Thus, the charging preferably is carried out in two steps, a first cyclovoltammetric (CV) step between 1.6V and 2.8V, followed by a second step performed immediately after the first step which is a galvanostatic step from 2.8V to 4.1V, shifting the first deintercalation plateau from 2V to 2.5V.

An almost identical or an identical result can be achieved by storing the totally discharged battery for about 15 minutes prior to loading. Similar to the first loading step, the storage results in a relaxation of the material and potential equilibration above 2 V.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Several promising EAM for cathodes and anodes exist. However, many of them have to be used in form of nanoparticles due to low conductivity. One of the most promising cathode materials is $H_2V_3O_8$. Although this material stands out in view of its high lithium intercalation capacity (up to at least 4.5 Li per $H_2V_3O_8$) and its relatively low molecular weight (due to the presence of two hydrogen atoms it has the lowest possible molecular weight for such vanadium oxide), several difficulties had been encountered with it.

Figure 1:
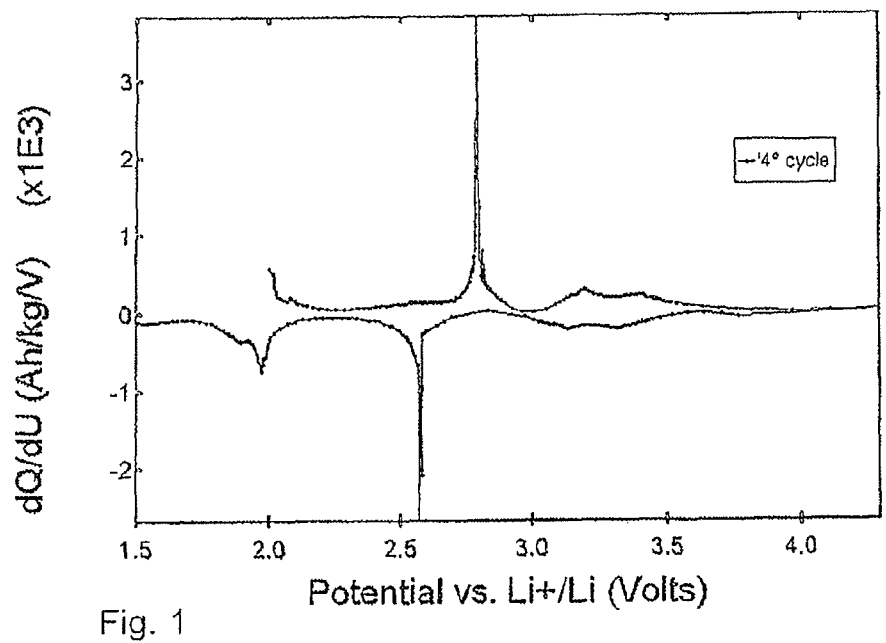
FIG. 1: Differential capacity (specific charge) plot from galvanostatic measurement of the $4^{th}$ cycle taken at 20 A/kg (1.5-4.3 V).

The fibrous $H_2V_3O_8$ is able to exchange a large amount of lithium. This is primarily due to its specific crystal structure Due to the volume work in connection with the intercalation/deintercalation of the Li ions the fibers decompose to small fragments but no phase transition is observed and the cyclovoltammogram remains almost constant (see FIG. 1).

Figure 2:
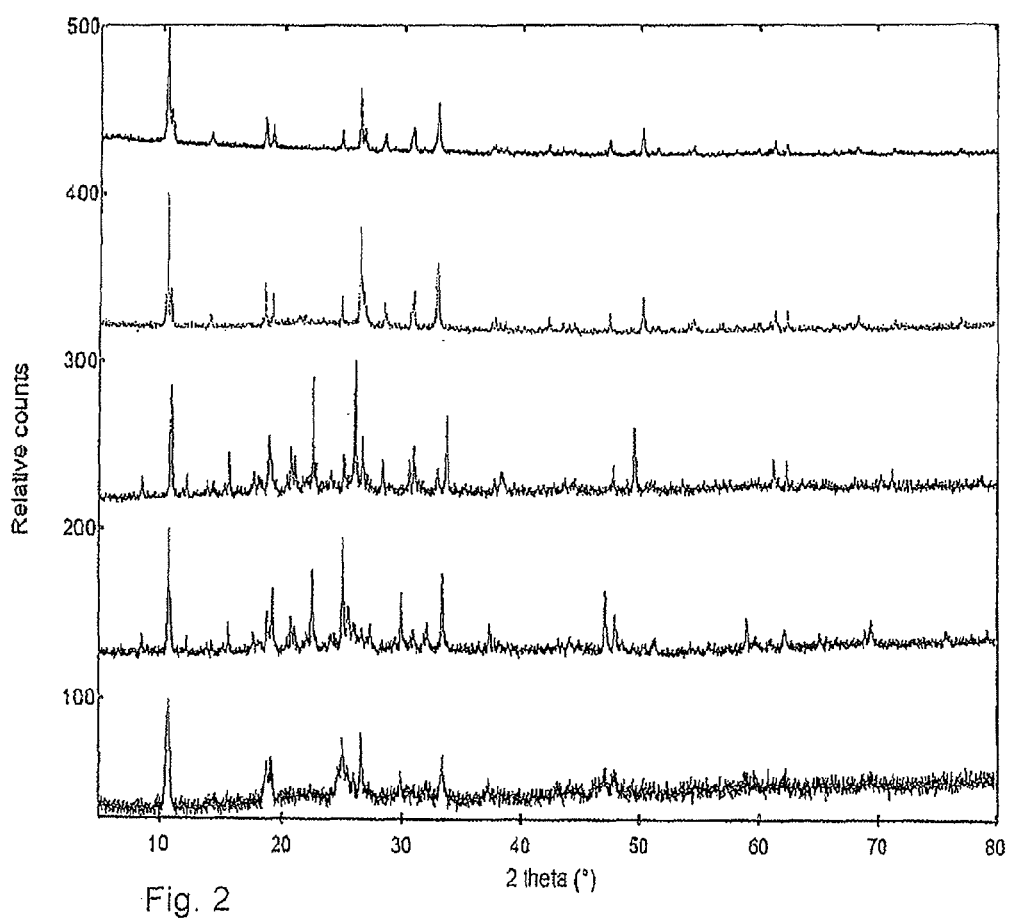
FIG. 2: The XRD powder data of vanadate samples electrochemically treated with 5 galvanostatic cycles (20 A/kg) till different voltage values (4.5, 3.0, 2.3, 1.5 V).

In FIG. 2 the XRD diagrams for different Li yields are shown corresponding to the potentials with regard to metallic Li and Table 1 shows the corresponding lattice constants that in particular show significant changes with respect to the Li content for the a axis.

TABLE 1

Rietveld refinement results of the electrochemically treated samples ended at different selected voltage

|  | a [Å] | b [Å] | c [Å] | 1.1.1.1.1.1. V [Å³] |
| --- | --- | --- | --- | --- |
| $H_2V_3O_8$ (ref.) | 16.8531 | 9.3179 | 3.6312 | 570.23 |
| 4.3 V | 16.83 | 9.316 | 3.640 | 570.9 |
| 3.0 V | 16.175 | 9.401 | 3.675 | 553.8 |

TABLE 1-continued

Rietveld refinement results of the electrochemically treated samples ended at different selected voltage

|  | a [Å] | b [Å] | c [Å] | 1.1.1.1.1.1. V [Å³] |
| --- | --- | --- | --- | --- |
| 2.3 V | 16.472 | 9.283 | 3.856 | 589.7 |
| 1.5 V | 16.479 | 9.296 | 3.854 | 590.4 |

Figure 3:
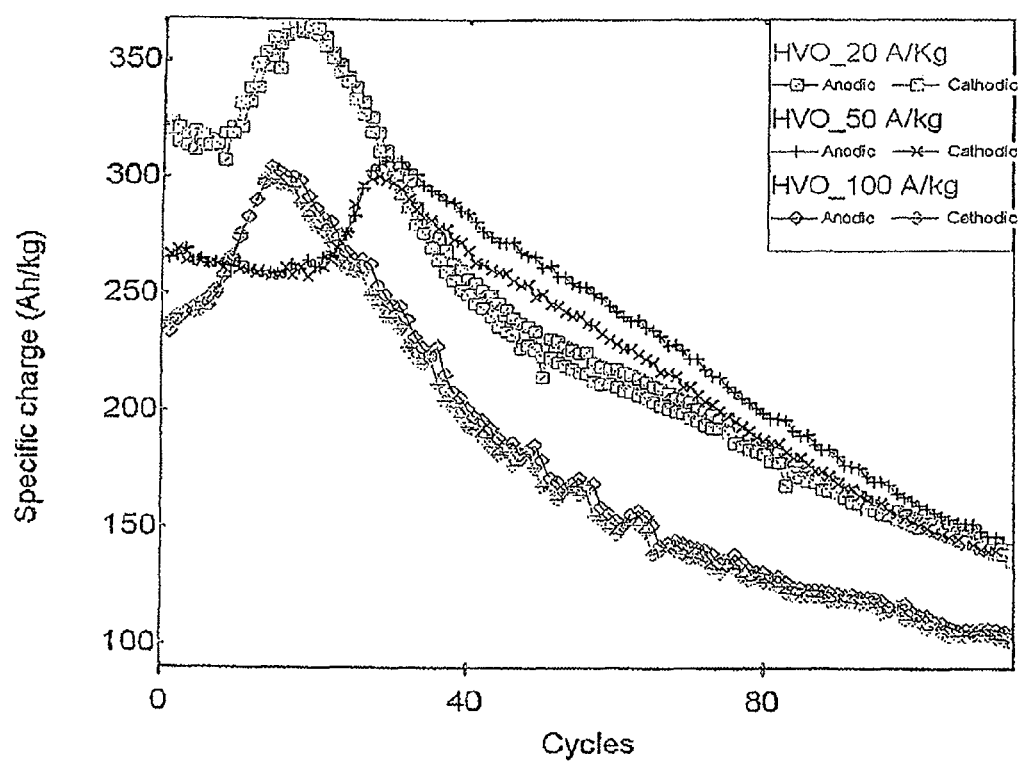
FIG. 3: Comparison of galvanostatic measurements of $H_2V_3O_8$ at different applied current densities (20, 50 and 100 A/kg) in the same voltage region (1.5-4.3 V).

In order to better understand what happens within a $H_2V_3O_8$ cathode, this volume work and its effects were closer investigated because they were considered of decisive importance for a respective cathode in lithium ion batteries. Thereby it was found that all galvanostatic measurements first showed an enhancement in specific charge or capacity of the material, respectively, between the $15^{th}$ and the $35^{th}$ cycle before the capacity diminished as can be seen in FIG. 3 that shows the respective measurements for different current densities.

Figure 4:
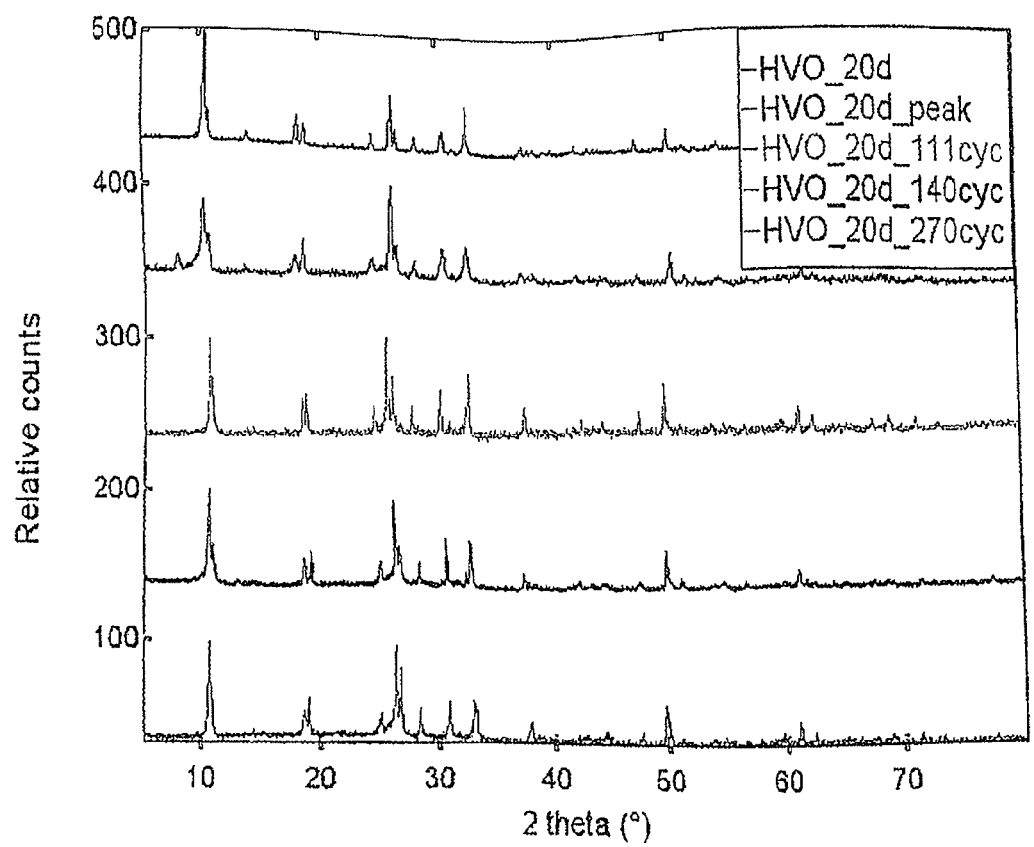
FIG. 4: Comparison of XRD data of samples resulting by a different number of galvanostatic cycles treatments, taken at 50 A/kg in the range 1.5-4.3 V and in the end delithiated.
Figure 5:
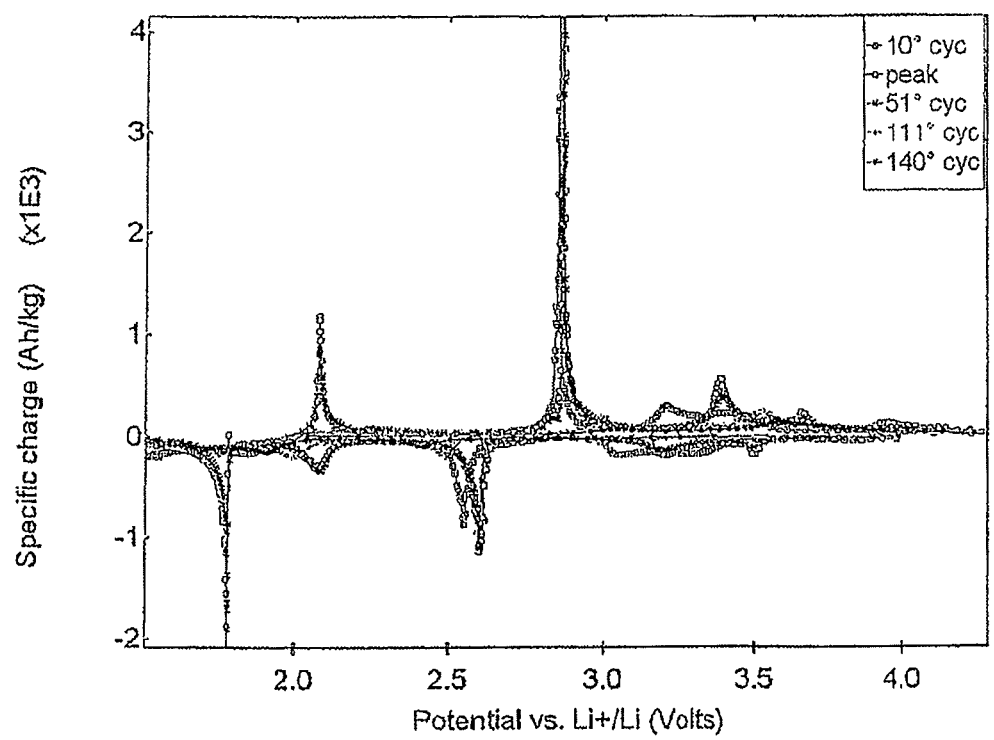
FIG. 5: Differential capacity plot from galvanostatic measurements at different cycles, taken at 50 A/kg (1.5-4.3 V).

In spite of the reduced capacity, the crystal structure largely remained the same (see FIG. 4 for up to 270 cycles at 50 A/kg that from a maximum capacity of about 300 Ah/kg after about 35 cycles came to a capacity of about 150 Ah/kg after about 111 cycles). As FIG. 4 illustrates, between the $2^{nd}$ and the $270^{th}$ cycle almost no structural changes could be observed. This finding was also confirmed by the cyclovoltagrams shown in FIG. 5.

Thus, other characteristics had to be found that were changed and that led to the dramatic loss of capacity. Therefore, the changes in fiber length were investigated and it was found that already after a few cycles the fibers were fragmented which first resulted in an enhancement of capacity but upon further fragmentation resulted in a loss of capacity. This behavior was interpreted as an improved capacity of smaller fibers, however connected to a reduced probability for contact to the current collector thereby leading to a loss of capacity.

Several starting points for improving the cathode features, such as improving the lifetime of state of the art $H_2V_3O_8$ cathodes, were examined. In an earlier co-owned not yet published patent application (European patent application no. 10 156 075.3, filed on Mar. 10, 2010) a method for producing $H_2V_3O_8$ cathodes with improved lifetime has already been described. Therein on the one hand a new method for binding the fibers was developed and an amended fiber starting material that both separately lead to an improvement but in particular if used together to form a cathode material coating and a new cathode.

Figure 6:
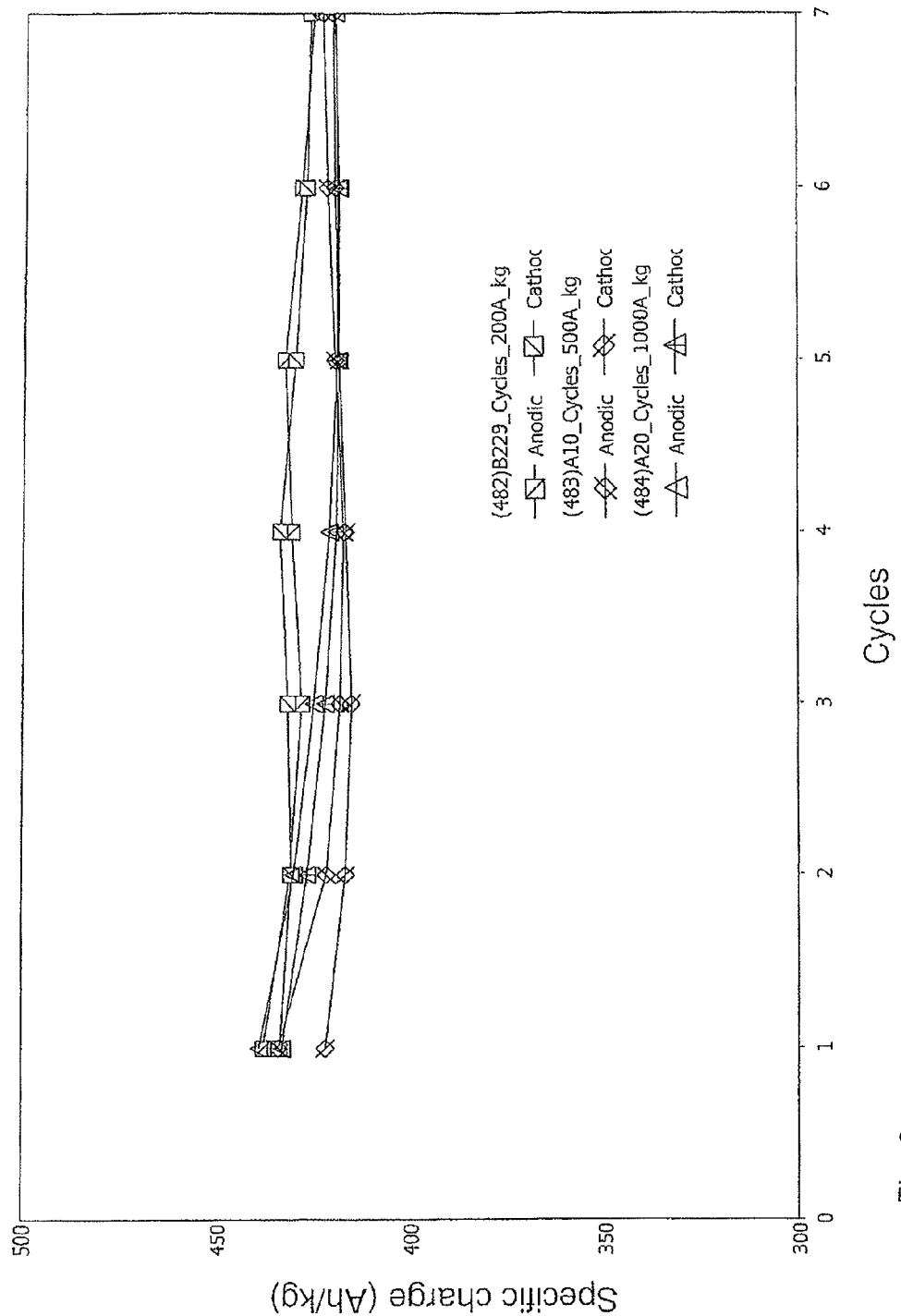
FIG. 6: Comparison of galvanostatic measurements of $H_2V_3O_8$ at different applied current densities (200, 500 and 1000 A/kg) in the same voltage region (1.5-4.3 V).

This earlier described but not yet published binding method allows to generate a porous, flexible and electrically conducting material wherein the fibers are incorporated in a way that they remain stable at very high capacity during many cycles, in particular if the $H_2V_3O_8$ fibers are treated with lithium ions prior to use to form a partially lithiated material with preferably 0.5 to 1.5, much preferred about 1 lithium per $H_2V_3O_8$. The stability of such material over many cycles can be seen from FIG. 6. The capacities achieved in the first electrochemical cycles are significantly above 400 Ah/kg and diminish only slightly during the following cycles. After 50 cycles, the capacity still was around 400 Ah/kg and the loss of capacity in this experiment was assumed to be rather due to the electrolyte and not to the active electrode material itself.

However, the production methods described in the earlier co-owned application—although leading to a much improved product—required many steps. Therefore, the inventors made additional studies to facilitate the process and they were able to improve not only the production method but also the product obtainable therewith. They were in particular able to further reduce the matrix content of the electrodes Example 1

Synthesis of $H_2V_3O_8$

First Method:

200 ml of a 0.06 M aqueous solution of vanadium (IV), such as vanadyl chloride pentahydrate, and 200 ml of distilled water were put in a 800 ml Teflon® inlet. The inlet was then transferred to a steel autoclave and placed in an oven which was previously preheated to 220° C. A magnetic stirrer (80 rpm) warranted the homogeneity of the solution. The temperature was kept constant for 12 hours. After removal of the autoclave out of the oven and cooling under ambient conditions, the green to green-yellow solid product was filtered, washed 2 times with distilled water and one times with isopropanol and dried in air at 120° C. for 3 hours. 450 to 550 mg substance were obtained this way.

A vanadyl chloride solution suitable for being used as starting material in the above reaction was prepared by quantitative precipitation of the sulfate out of a vanadyl sulfate solution with barium chloride. After filtration with microsize filter (0.22 μm pore diameter) a clear vanadyl chloride solution was obtained.

The oxidative route of the present invention is safe and fast. Preferably vanadium (IV) is used in excess in the reaction mixture such that some vanadium (IV) remains in the mixture at the end of the synthesis. The vanadyl solution is acidic (pH≤3). Hydrothermal treatment was performed during 12 h at 220° C. (temperature measured at the outside of the reaction vessel or 180° C. if the temperature is measured within the reaction mixture). The 12 h at 220° C. are a minimum. No more than half of the reaction vessel should be filled. In order to prevent aggregation, the product may be washed with a non-coordinating solvent.

Second Method

Preferred Method for Obtaining Homogeneous Nanosized $H_2V_3O_8$ 3 g $VOSO_4.5H_2O$ were dissolved in 50 ml deionized water. 2 ml of 25% by weight ammonia ($NH_4OH$) were then added. The dense precipitate which forms immediately is filtered and the grey wet solid product collected, put in a Teflon® vessel of an autoclave and dispersed in 400 ml distilled water. After addition of 1 ml 12 M HCl, the autoclave was sealed and the suspension treated hydrothermally for 48 hours at 220° C. At the end of the reaction, the green to green-yellow solid product was filtered, washed with water and isopropanol and dried at 100° C. in air overnight. 750 mg $H_2V_3O_8$ were obtained. The vanadium yield equaled 70%.

Example 2a

Figure 7:
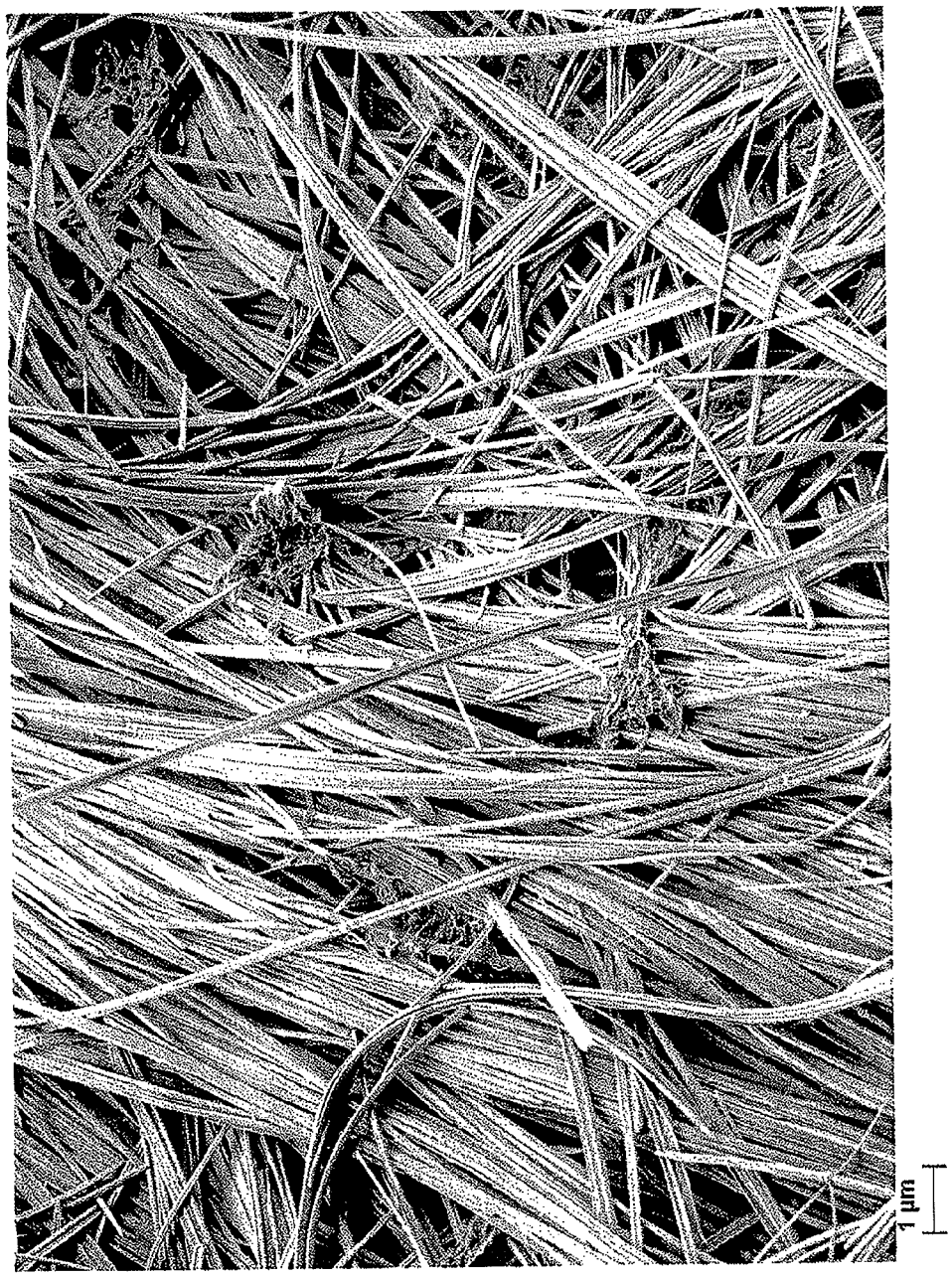
FIG. 7: SEM microphotograph of an active electrode material prepared according to Example 2a, showing the microparticulate EAM, the pyrolized matrix and the therein incorporated graphene flakes.

Self-Assembly, Lithiation and Carbonization 0.68 mg (0.0071 mmol) lithium lactate, 0.8 mg (0.0049 mmol) vanadyl sulfate and 0.3 mg (0.0125 mmol) lithium hydroxide were dissolved in 0.5 ml distilled water in a 10 ml tightly closeable test tube. 1.5 ml graphene oxide (GO) solution (prepared according to Example 3) was then added and the test tube was gently shaken in order to obtain a bright brownish clear solution. 20 mg (0.0707 mmol) $H_2V_3O_8$ were dispersed in the solution, the test tube sealed and the resulting suspension homogenized through ultrasound and vigorous shaking. Once homogenization was completed, the test tube containing a green suspension was put in an oven and kept at 150° C. for 1.5 h. During this hydrothermal step, the pressure inside the vessel increased to approx. 3-4 bar while lithiation, self-assembly and thermolysis of GO to graphene took place. The suspension changed into a black liquid with a dense (dark blue) solid floating in it. At the end of the hydrothermal treatment, this dark blue solid, which represents the electrode, was collected and put on an aluminum collector where the remaining liquid was removed, e.g. by soaking with a tissue, until the tissue remained dry after having been pressed against the solid deposit on the current collector. Then drying was continued by air drying at 85° C. for 10 min. The last step consisted in a 5 min. exposition at 220° C. in air and subsequent transfer to an argon glove box (at least 1 h evacuation). A SEM picture of the active electrode material is shown in FIG. 7, a typical discharge curve in FIG. 8 and a galvanostatic measurement in FIG. 9.

Example 2b

Self-Assembly, Lithiation and Carbonization

Chemicals

Figure 8:
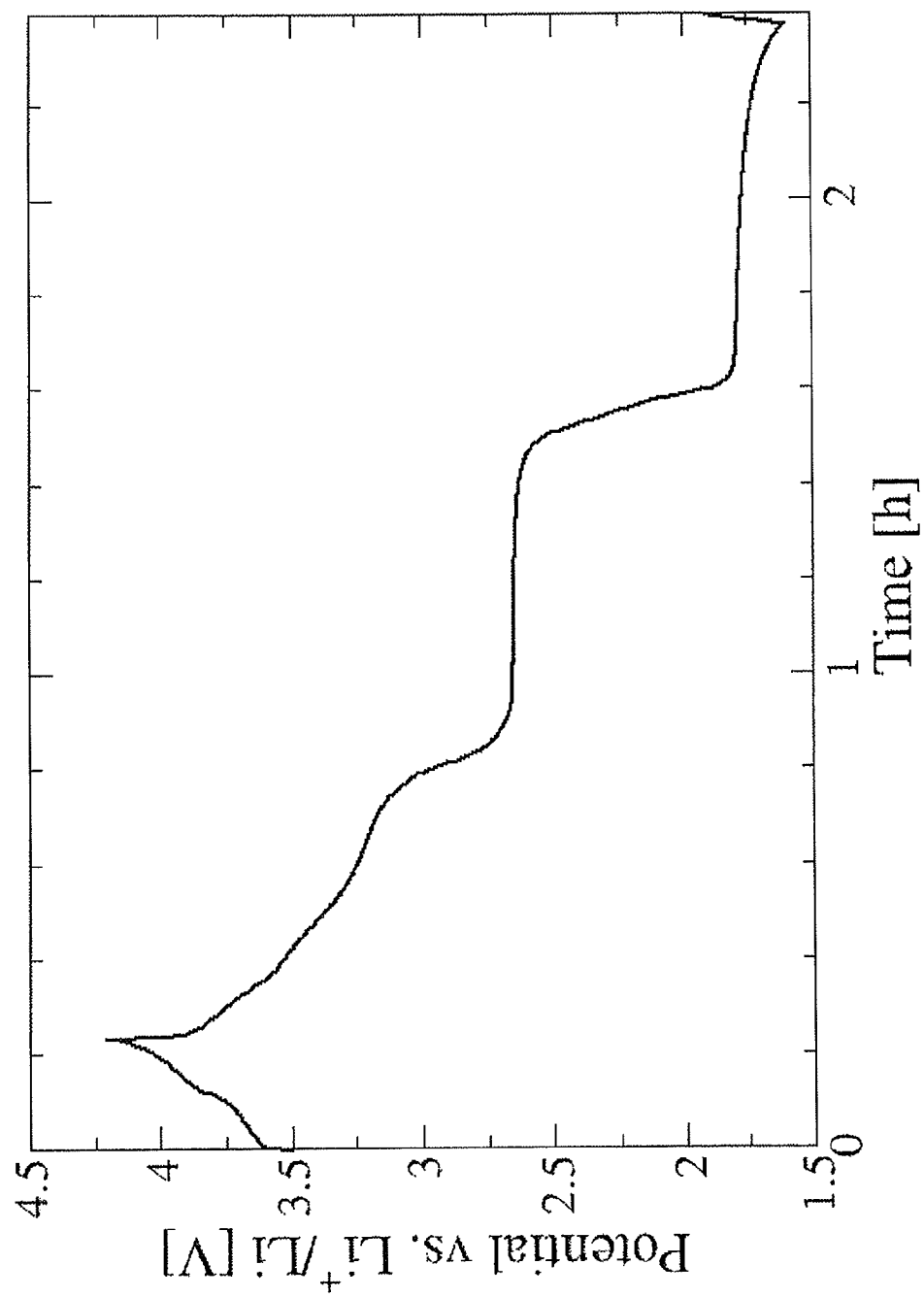
FIG. 8: Discharge curve of the active electrode material prepared according to Example 2a at 200 A/kg.
Figure 9:
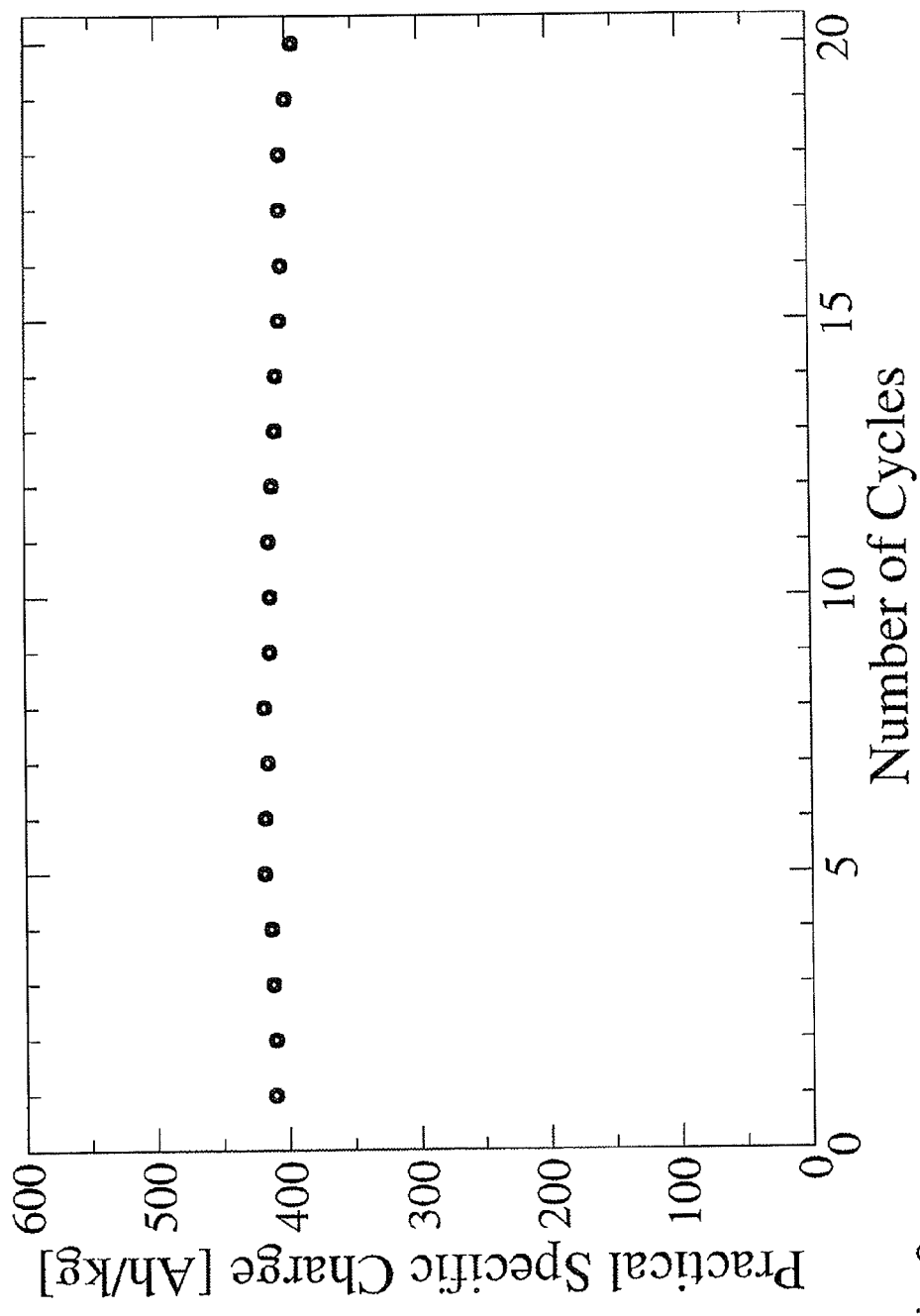
FIG. 9: Galvanostatic measurement of the active electrode material prepared according to Example 2a at 200 A/kg.
Figure 10:
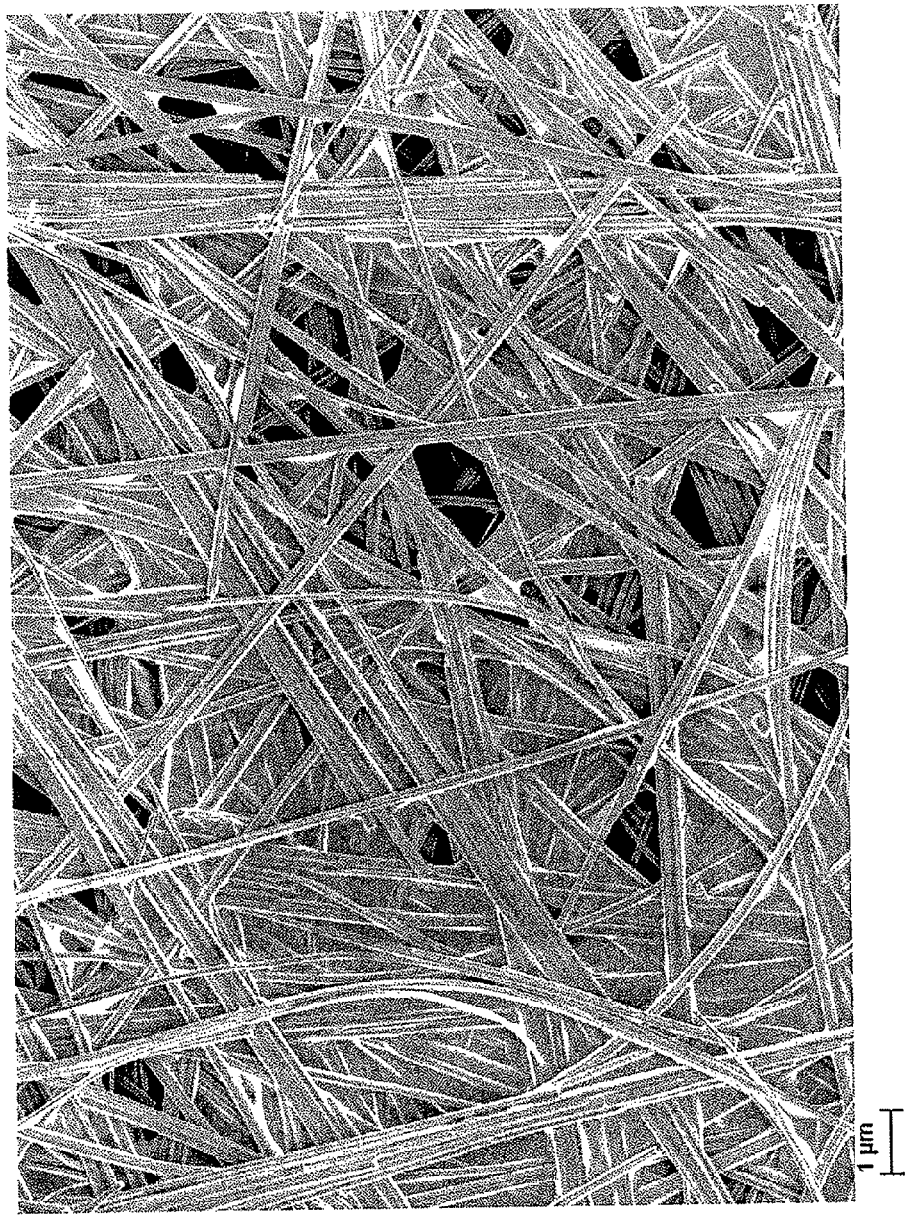
FIG. 10: SEM microphotograph of an active electrode material prepared according to Example 2b, showing the microparticulate EAM, the pyrolized matrix and the therein incorporated graphene flakes.
Figure 11:
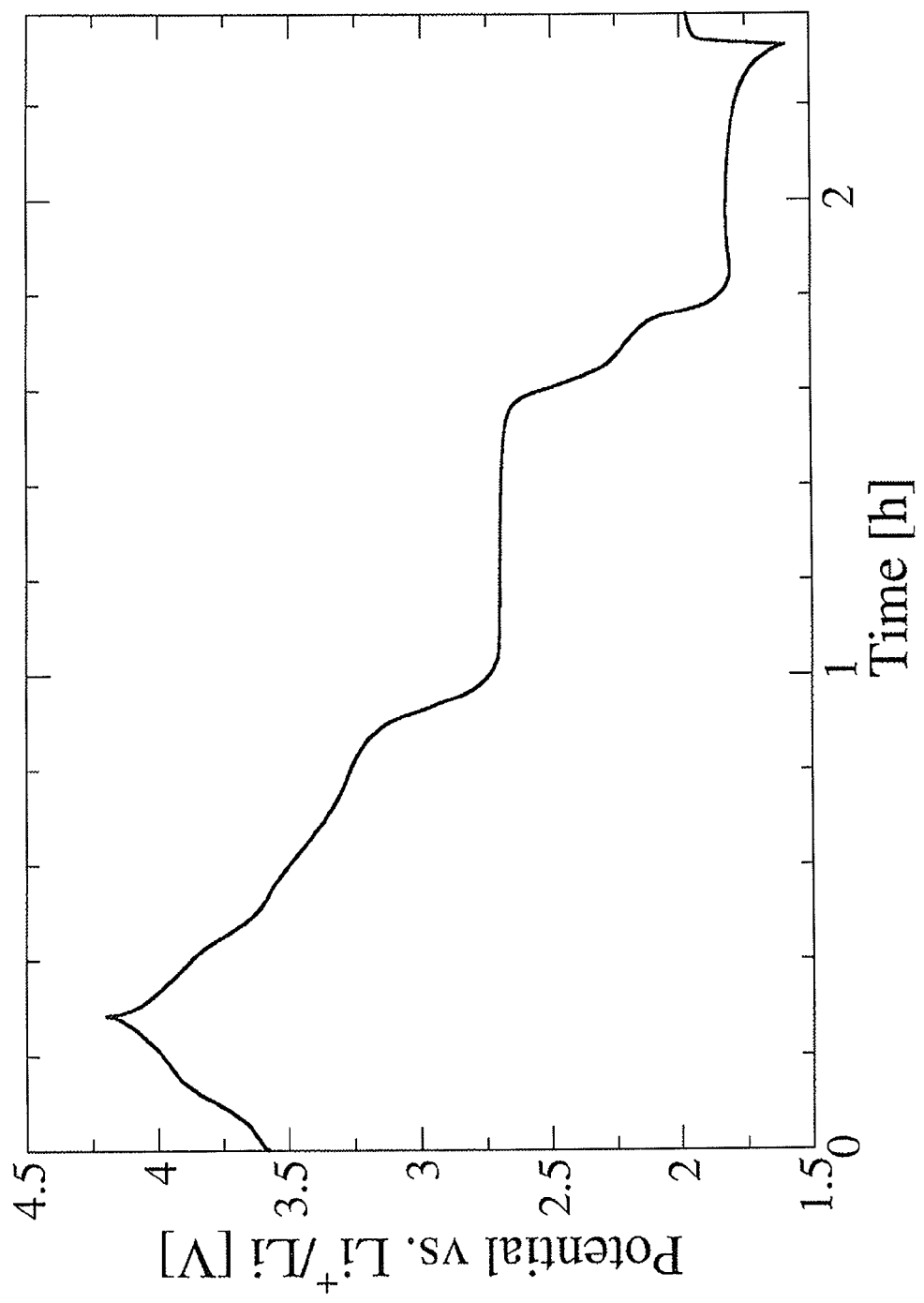
FIG. 11: Discharge curve of the active electrode material prepared according to Example 2b at 200 A/kg.
Figure 12:
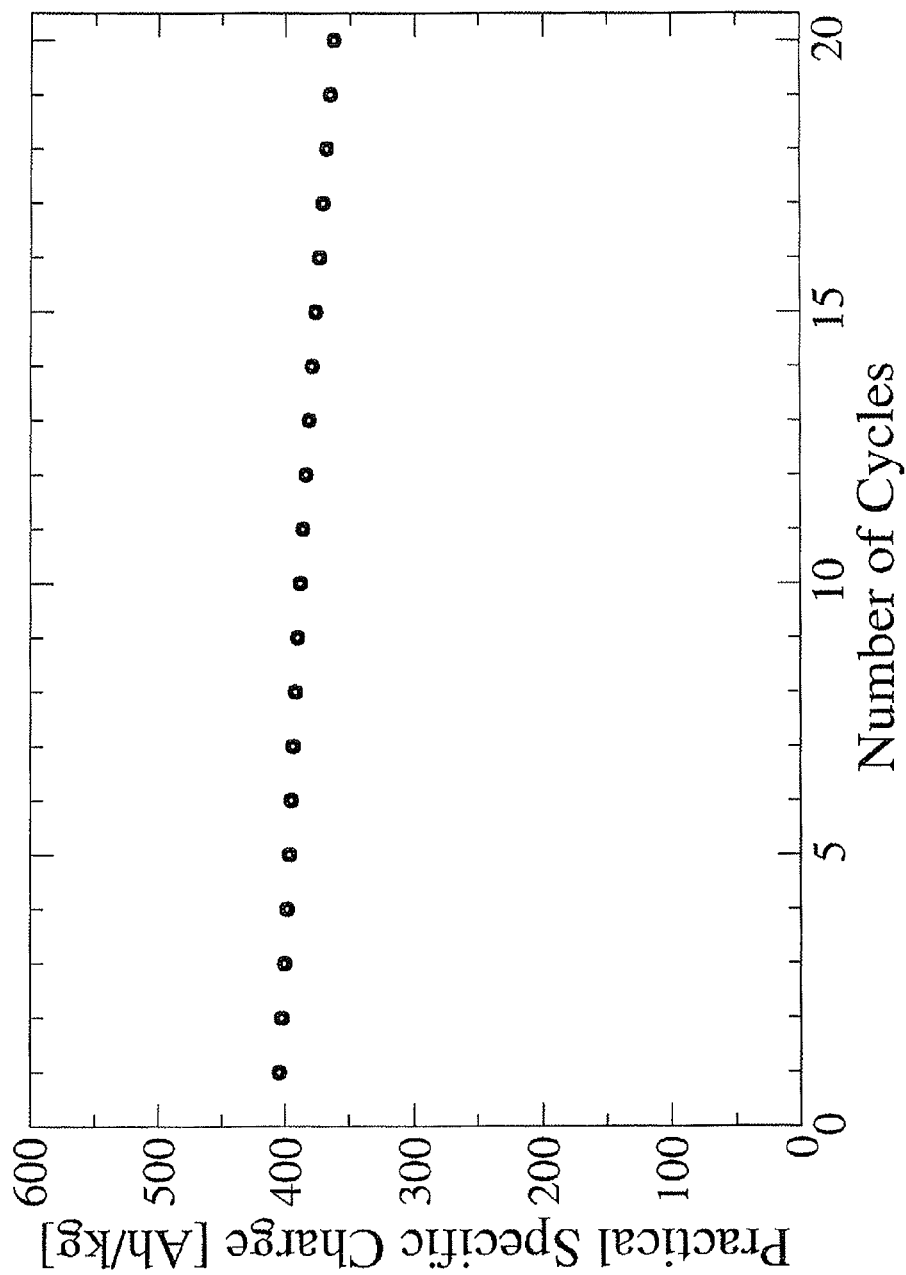
FIG. 12: Galvanostatic measurement of the active electrode material prepared according to Example 2b at 200 A/kg.
Figure 13:
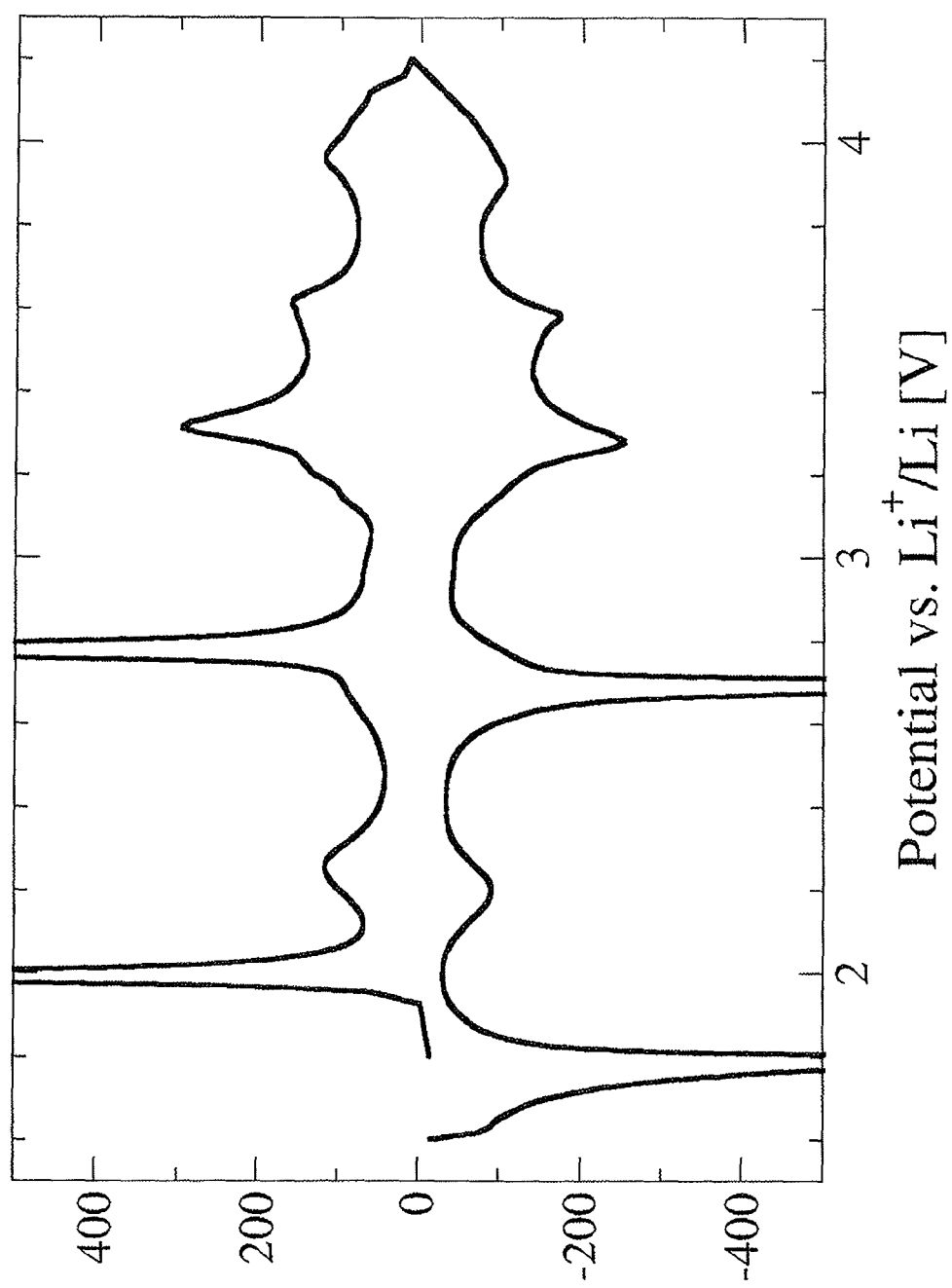
FIG. 13: Differential capacity plot of the actine electrode material prepared according to Example 2b from galvanostatic measurement at the 7th cycle, taken at 200 A/kg (1.6-4.2 V).
Figure 14:
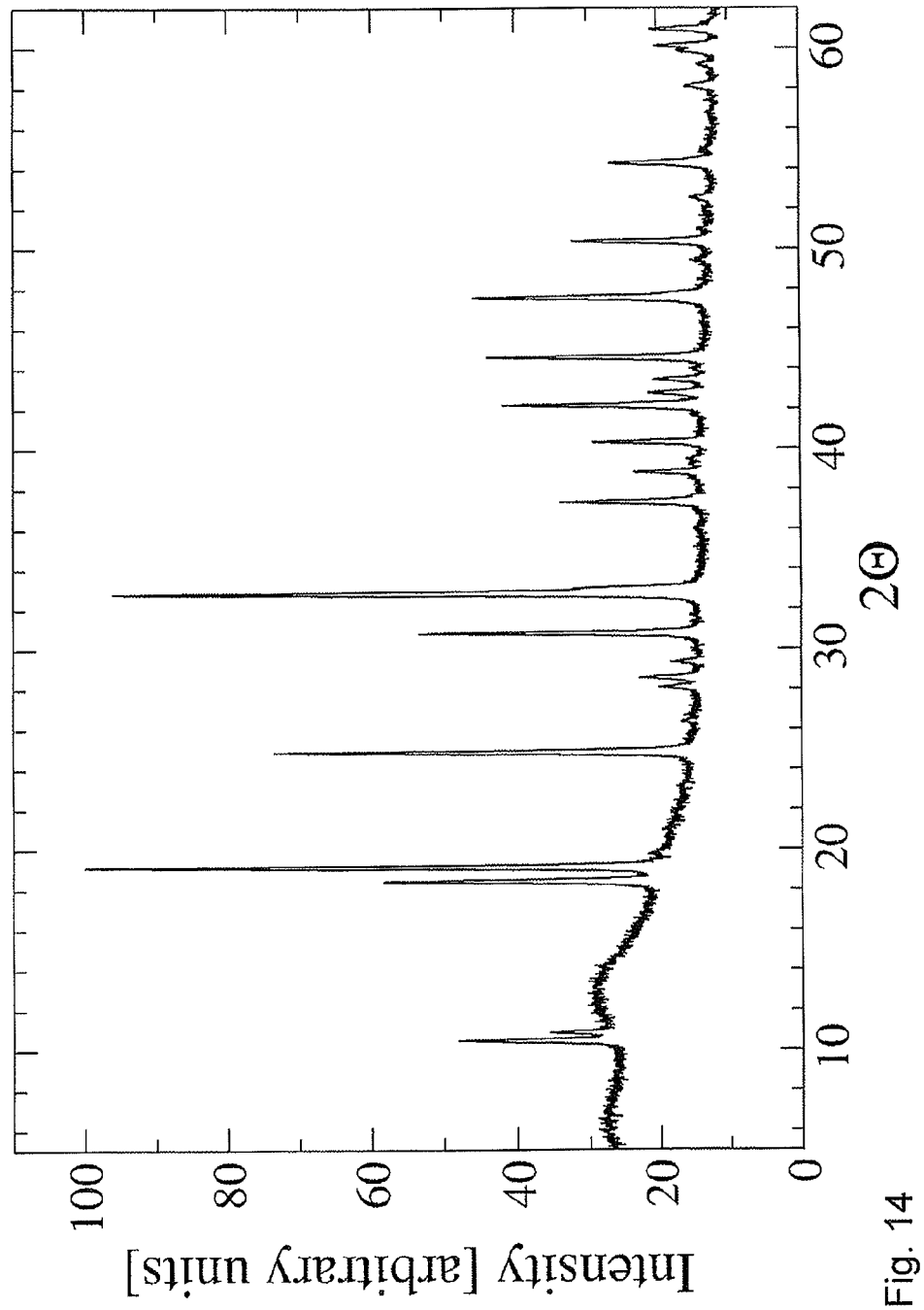
FIG. 14: The XRD powder data of the active electrode material prepared according to Example 2b before galvanostatic measurement.

The following chemicals were used: 20 mg $H_2V_3O_8$, 150 mg $VOSO_4.5H_2O$, 60 mg lithium lactate, 5 ml graphite oxide (GO) solution (0.5 g/l), 5 ml distilled water, 60 mg Li—$OH.H_2O$ Equipment The following equipment was needed: 1 paper filter, 1 ceramic funnel filter, 1 20 ml beaker and 1 magnetic stirrer Electrode Preparation The vanadyl sulfate was dissolved in water in a beaker with magnetic stirrer. $H_2V_3O_8$ was added and dispersed shortly through ultrasonication and stirring. GO solution (prepared according to Example 3) was added dropwise while stirring. The mixture was left for 30 minutes with stirring and then the suspension was frozen. The time during which the suspension was kept in a frozen state is uncritical. It may be warmed up as soon as it has reached the fully frozen status. Once the suspension had warmed up again to room temperature (RT) and stirring worked again, lithium lactate was added and dissolved. Once the lithium lactate was fully dissolved, lithium hydroxide powder was added. Once the color of the suspension had turned to a dark blue, the product was filtered, rinsed with thf and then left drying at RT. Then the electrode material was separated from the filter, usually in the form of a solid disk and dried at 150° C. for 15 minutes in air. The electrode material, which had become green again, was transferred in an oven operated at 220° C. for 10 minutes. For cooling, the hot electrode material was then transferred in a glove box where the electrode material was evacuated for at least 30 minutes. A SEM picture of the active electrode material is shown in FIG. 8, a typical discharge curve in FIG. 11, a galvanostatic measurement in FIG. 12, a differential specific charge plot (7th cycle) in FIG. 13 and an XRD pattern of the active electrode material in FIG. 14.

Battery Assembly

For preparing an electrode, a piece of the electrode material was cut of the disk, weighted (for interpretation of the results) and placed on a metallic current collector. The electrode then was covered first with a polypropylene cellguard separator and then with one silica foam separator, the cell was filled with LP30 electrolyte (1M LiPF6 in EC/DMC 1:1), the lithium anode was placed inside and the cell closed tightly.

Example 3

Preparation of Colloidal GO Dispersion (Also Referred to as GO Solution)

Example 3.1

Preparation of Graphite Oxide

Graphite oxide was prepared according to the well known method by Brodie as modified by Boehm et al. [8].

10 g graphite were thoroughly mixed with 85 g sodium perchlorate powder. The mixture was cooled to approx. −20° C. using an ice sodium chloride mixture and then slowly stirred with an efficient stirrer. Then 60 ml fuming nitric acid were very slowly added. The viscous green mass was stirred for an additional 30 minutes at room temperature. The mixture was left over night without agitation and then slowly heated to 60° C. for 10 hours. Then 2 liters of water were added to the reaction product, the mixture was filtered and once washed with diluted hydrochloric acid and at least twice, each time with 2 liters of water. After filtration, the obtained mass was freeze dried yielding about 14 g of graphite oxide as a very fluffy ivory colored powder.

Based on the elemental analysis of the graphite oxide the chemical formula $C_8O_4H_{1.7}$ results. After subtraction of hydrogen as water the formula $C_8O_{3.2}$ is obtained with a C/0 ratio of 2.5. Using X-ray diffraction analysis it could be shown that the inter-planar distance of 3.35 Å in graphite was enlarged to 6.1 Å in dry graphite oxide.

Example 3.2

Preparation of a Colloidal Graphene Oxide Dispersion 100 mg of the graphite oxide obtained as described in Example 3.1 were added to 100 ml of deionized water, thoroughly stirred for 12 hours and then left in an ultrasonic bath for 1 hour. The such obtained colloidal dispersion of graphite oxide (further on referred to as graphene oxide), was then reacted to colloidal graphene dispersion (see below).

The colloidal graphene oxide dispersion obtained by dispersing graphite oxide in water was optically clear to the naked eye and even in the light microscope at 1000 fold magnification, free of particles and had a pH of about 5. Using a laser, the resulting Tyndall effect showed that the graphite oxide resulted in a colloidal dispersion.

If such dispersion is diluted and then applied to a suitable sample holder, scanning force microscopy reveals that the colloidal dispersion consists of single layers of oxidized graphene, i.e. graphene oxide.

Example 4

Effect of the Storage Time on the $H_2V_3O_8$ Electrode of Example 2a (Aging Prior to the Electrochemical Application)

When assembled cells ($H_2V_3O_8$ electrode prepared by the hydrothermal method) were left on storage at 30° C., the OCV values decreased by approximately 200 mV in 4 days. The exact shape of the decay (potential vs time) has to be characterized yet, though it probably follows an exponential path with negative curvature (fast drop in the beginning slowing down towards equilibrium). Immediately after assembly, the OCV was at 3.50V. After 4 days storage, the OCV decreased to 3.30V. After 3 days storage, the OCV equaled 3.45 V (see Figure A).

The diminished OCV comes from self-discharge during which part of the electrolyte is oxidized by vanadium (V). The process greatly influenced the performances of the battery. Electrochemical measurements showed improved kinetics. The time (and therefore the capacity) obtained from the first charge increased with prolonged storage time. Close to theoretical capacity (420-450 Ah/kg) values could be obtained durably in this way.

Example 5

Improved Charging Technique for the $H_2V_3O_8$ Electrode of Example 2a

Figure 15:
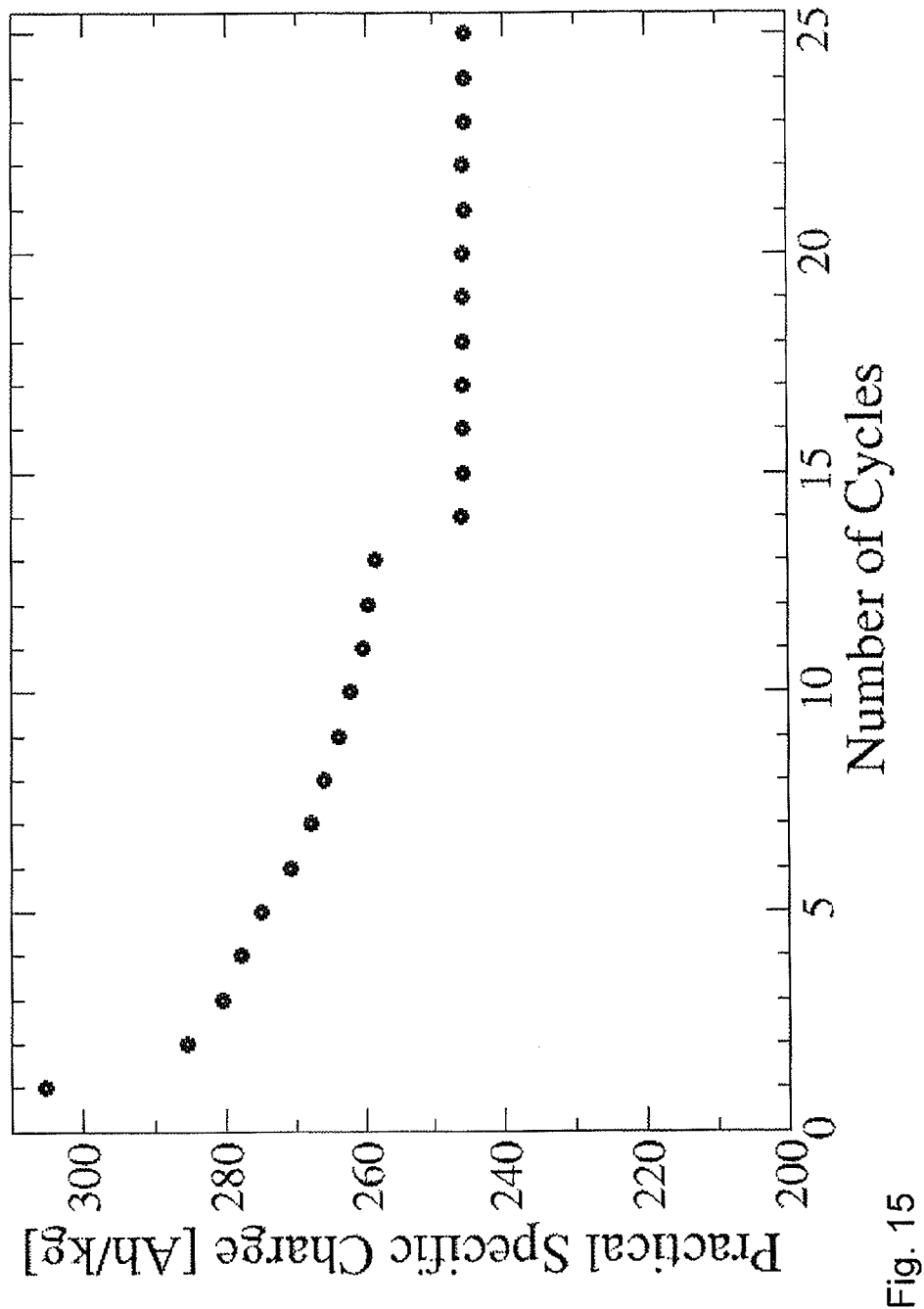
FIG. 15: Natural stabilization observed within the $14^{th}$ to $15^{th}$ cycle (100 A/kg).
Figure 16:
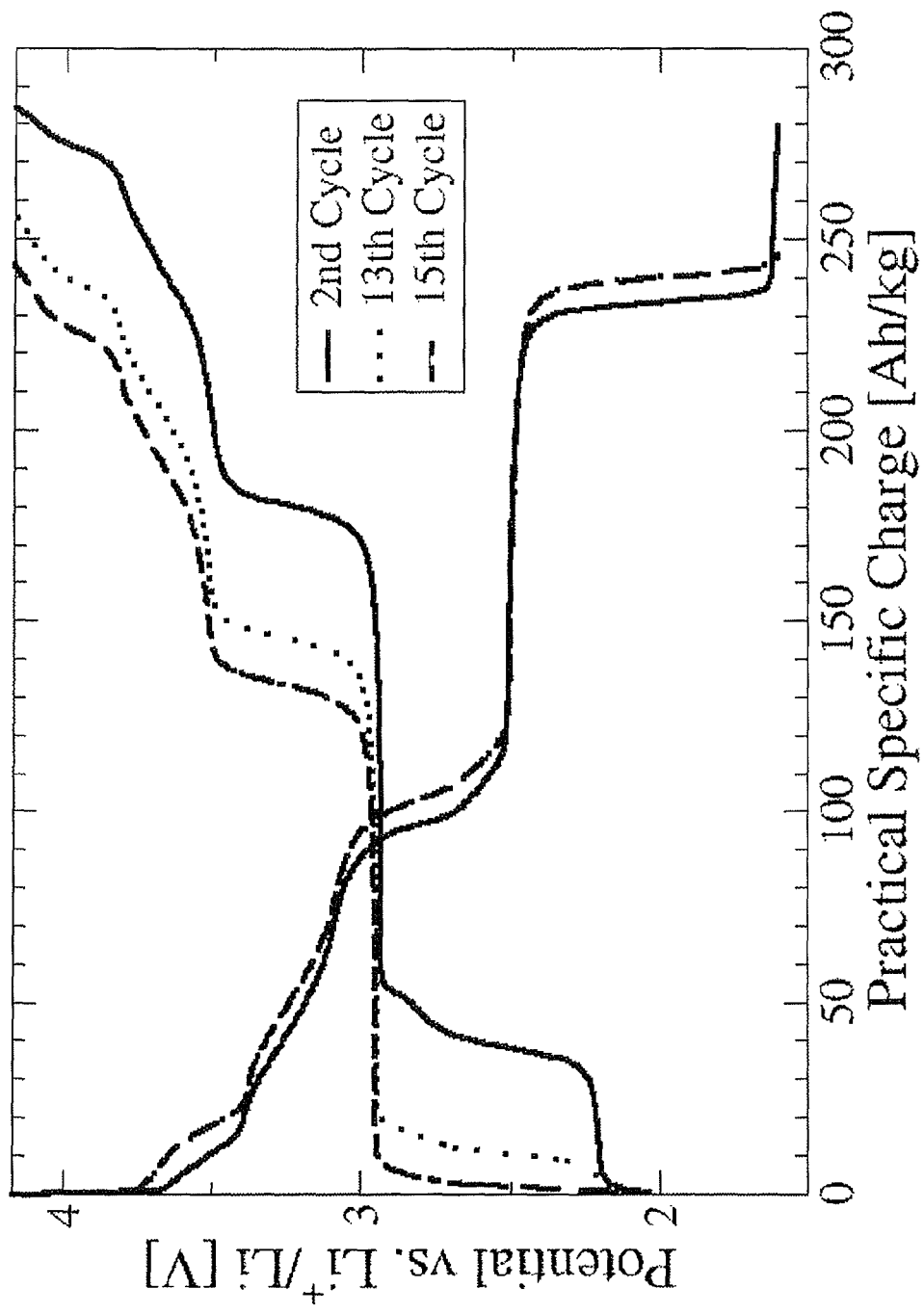
FIG. 16: Natural shift of the 2V oxidation peak within the $14^{th}$ to $15^{th}$ cycle (100 A/kg) (same experiment as for FIG. 15).
Figure 17:
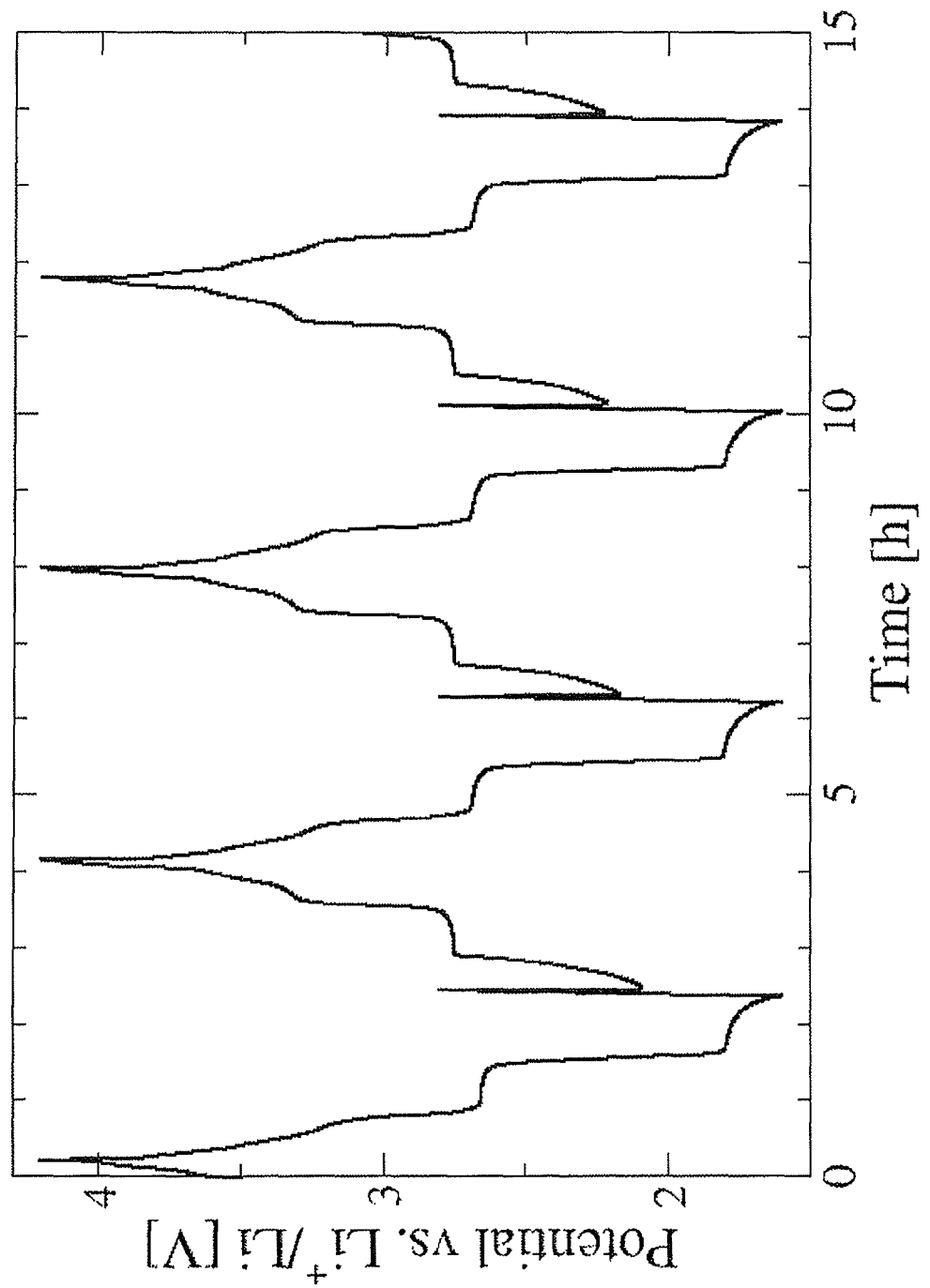
FIG. 17: Artificial shift of the 2V oxidation peak with a 2 steps charging (200 A/kg).

Stable $H_2V_3O_8$ electrodes have the particularity to behave asymmetrically on charge and discharge (potential vs time). Their discharge curve displays three electroactive regions, while during the charge only two regions are observable. The deintercalation at the lowest potential (2V) does not occur in the charging curve. Nevertheless, anodic and cathodic capacities remain equal, since the missing lithium is extracted at 2.7V. A natural occurrence of this property is exemplified in FIGS. 15 and 16, and can be artificially produced as shown in FIG. 17. A completed charge step between 1.6V and 2.7V presents a polarization part, a short plateau at 2V (approximately half of the one during discharging) and a linear region to the 2.7V plateau. The electrochemical activity between 2V and 2.7V could not be correlated to one of the phases generated during the discharge and might trigger irreversible processes. It is believed that the 2V plateau is responsible for the rearrangement of protons inside the vanadate and that the plateau shortens because the partial rearrangement creates disorder in the structure which makes the lithium extraction more energy demanding. In fact, it was observed that the plateau shortened more and more during the degradation of the cell's performance and converted into the linear region over time. This phenomenon led to amorphization of $H_2V_3O_8$ (see Figure B).

It was possible to suppress artificially the deintercalation at 2V by programming a cyclovoltammetric (CV) step at the beginning of the discharge. The idea was to quickly polarize the electrode close to 2.7V and then proceed with the galvanostatic charge at a chosen current. A suitable CV step for example was 5 mV/sec until 2.8V (see Figure B). This procedure caused the 2V plateau to gradually disappear at the profit of more extraction at higher potential and eventually generated an extra plateau at 2.5V. This treatment increased the shelf life of the battery (see Figure C).

Example 6

Electrochemistry of the Electrode of Example 2b

For investigating the electrode, a .mpr program with two galvanostatic steps a nd a "counter step" was prepared. Charging was performed until 4.2 V (C/3.5). Discharging took place at −100 A/kg until 1.6 V. The desired number of cycles and the reference to the charge step was added. The battery was put on the platform and the OCV (3.58V) was noted. Then the experiment was started.

A similar result was obtained if instead of the CV step a relaxation step was used, i.e. a fully discharged cell was allowed to rest for 15 to 20 minutes prior to charging resulting in a relaxation to little above 2V.

CONCLUSION

Electrochemical Cycling and Energy Storage Capability

It was found to be beneficial to carry out the charging in two steps. The first step was a fast cyclovoltammetric (CV) step between 1.6V and 2.8V. The second step was performed immediately after the first step and was a galvanostatic step until 4.1V. The first deintercalation plateau shifted from 2V to 2.5V. A similar effect is obtainable if charging begins after a storage time or a rest time of the fully discharged battery of a time sufficient to allow relaxation to little above 2 V, typically about 15 to 20 minutes.

While there are shown and described presently preferred embodiments of the invention, it is to be distinctly understood that the invention is not limited thereto but may be otherwise variously embodied and practiced within the scope of the following claims.

LITERATURE

[1] Theobald, F. and R. Cabala, *Comptes Rendus Hebdomadaires des Seances de L'Academie des Sciences, Serie C,* 1970, 270(26), 2138.

[2] Oka, Y., T. Yao, and N. Yamamoto, *Journal of Solid State Chemistry,* 1990, 89(2), 372.

Oka, Y., T. Yao, and N. Yamamoto, *Journal of Solid State Chemistry,* 1990, 86(1), 116.

[3] WO 01/74716
[4] Electrochimica Acta 54 (2009) 1115-1118
[5] Chem. Eur. J. 2008, 14, 11141-11148
[6] J. Electrochem. Soc., Vol. 145, No. 2, 1998
[7] Chem. Mater. 2005, 17, 984-991
[8] H. P. Boehm et al.; Annalen der Chemie; 1965; 691; 1-8

The invention claimed is:

1. An electrode, for a rechargeable lithium battery, comprising and preferably consisting of electronically active material (EAM) in nanoparticulate form and a matrix, characterized in that, prior to the first charging or discharging, the EAM is $Li_xH_{2-x}V_3O_8$, wherein at least 1 of the 3 V-atoms in the formula unit has the oxidation state 4+ and wherein x ranges from 0.1 to 1.5.

2. The electrode of claim 1 characterized in that said matrix consists of a pyrolization product with therein incorporated graphene flakes.

3. The electrode of claim 2, wherein a ionic lithium source is incorporated in the pyrolization product.

4. The electrode of claim 2, wherein a stabilizing agent is incorporated in the pyrolization product.

5. The electrode of claim 2, wherein the weight ratio of the matrix in the electrode is at most 10% by weight, referred to the weight of the active electrode and/or the amorphous carbonaceous material to graphene ratio is from 2:1 to 1:1.

6. The electrode of claim 5, wherein the amorphous carbonaceous material to graphene ratio is about 3:2.

7. The electrode of claim 5, wherein the weight ratio of the matrix in the electrode is 5±2% by weight referred to the weight of the active electrode.

8. A rechargeable battery comprising a cathode and/or an anode of claim 1.

9. The battery of claim 8, wherein the electrolyte is selected from $LiPF_6$ or $LiPF_3(C_2F_5)_3$ in a mixture of ethylene carbonate with ethyl methyl carbonate and/or dimethylcarbonate.

10. The battery of claim 8, wherein the cathode is a $H_2V_3O_8$ cathode comprising $Li_xH_{2-x}V_3O_8$ and the first intercalation plateau is shifted from 2V to 2.5V.

11. A method for producing a battery wherein an electrode of claim 1 is placed in a cell and covered with at least one separator, the cell is filled with electrolyte, the cell is completed with a lithium anode and tightly closed.

12. A method for improving the battery of claim 1, wherein the battery is stored under conditions corresponding to 3 to 4 days at 30° C.

13. A method for charging a battery of claim 1, wherein a fast cyclovoltammetric step is performed between 1.6V and 2.8V and a galvanostatic step between 2.8V and 4.1V.

14. The electrode of claim 1, wherein x ranges from 0.5 to 1.5.

15. The electrode of claim 1, wherein x is close to 1.

* * * * *